United States Patent
Elrefaey et al.

(10) Patent No.: US 9,226,160 B2
(45) Date of Patent: Dec. 29, 2015

(54) RADIO SPECTRUM TRADING

(71) Applicant: Intel Corporation, Santa Clara, CA (US)

(72) Inventors: Mohamed Elrefaey, Cairo (EG); Mohamed H. Shoeb, Cairo (EG); Hani H. Elgebaly, Cairo (EG)

(73) Assignee: Intel Corporation, Santa Clara, CA (US)

( * ) Notice: Subject to any disclaimer, the term of this patent is extended or adjusted under 35 U.S.C. 154(b) by 200 days.

(21) Appl. No.: 13/799,530

(22) Filed: Mar. 13, 2013

(65) Prior Publication Data

US 2014/0171018 A1    Jun. 19, 2014

Related U.S. Application Data

(63) Continuation-in-part of application No. 13/717,049, filed on Dec. 17, 2012.

(51) Int. Cl.

| | |
|---|---|
| *H04W 74/04* | (2009.01) |
| *G06Q 10/00* | (2012.01) |
| *H04W 16/04* | (2009.01) |
| *H04M 15/00* | (2006.01) |
| *H04W 4/24* | (2009.01) |

(52) U.S. Cl.
CPC ............ *H04W 16/04* (2013.01); *H04M 15/805* (2013.01); *H04M 15/8044* (2013.01); *H04W 4/24* (2013.01)

(58) Field of Classification Search
USPC ........................ 455/450, 452.2, 509, 523, 512
See application file for complete search history.

(56) References Cited

U.S. PATENT DOCUMENTS

| | | | | |
|---|---|---|---|---|
| 6,690,929 | B1 * | 2/2004 | Yeh ............................... | 455/406 |
| 2004/0192324 | A1 * | 9/2004 | Rudkin ....................... | 455/452.2 |

(Continued)

FOREIGN PATENT DOCUMENTS

| | | |
|---|---|---|
| CN | 102026201 A | 4/2011 |
| TW | 201006273 A | 2/2010 |

OTHER PUBLICATIONS

International Preliminary Report on Patentability and Written Opinion received for PCT Patent Application No. PCT/US2013/043527, mailed on Aug. 23, 2013, 11 pages.

(Continued)

*Primary Examiner* — Edward Urban
*Assistant Examiner* — Ralph H Justus
(74) *Attorney, Agent, or Firm* — Grossman, Tucker, Perreault & Pfleger, PLLC

(57) ABSTRACT

Radio spectrum trading involves determining available radio spectrum and requestors desiring to lease portions of the available radio spectrum, and for allocating the available spectrum to the requestors. A pricing curve may be set based on historical information and/or requests to lease spectrum. A determination may then be made as to whether an amount of available spectrum is less than or greater than an amount spectrum being requested. If it is determined that the amount of available spectrum is less than the amount of spectrum being requested, then an auction may be conducted for the available spectrum with the initial bid being set based on the pricing curve. If the amount of available spectrum is greater than the amount of spectrum being requested, then the requests may be sorted based on predicted revenue generation and the available spectrum may be allocated in order from highest to lowest revenue generated.

19 Claims, 13 Drawing Sheets

(56) References Cited

U.S. PATENT DOCUMENTS

| | | | |
|---|---|---|---|
| 2005/0064874 A1 | 3/2005 | Beacken | |
| 2006/0083205 A1* | 4/2006 | Buddhikot et al. | 370/338 |
| 2006/0143111 A1 | 6/2006 | Mylet | |
| 2006/0160543 A1* | 7/2006 | Mashinsky | 455/452.2 |
| 2008/0108365 A1* | 5/2008 | Buddhikot et al. | 455/452.1 |
| 2008/0222019 A1 | 9/2008 | Stanforth et al. | |
| 2010/0097952 A1 | 4/2010 | McHenry et al. | |
| 2011/0029347 A1* | 2/2011 | Kozat et al. | 705/8 |
| 2012/0264396 A1 | 10/2012 | Smith et al. | |
| 2013/0275346 A1 | 10/2013 | Srikanteswara et al. | |
| 2014/0146693 A1* | 5/2014 | Chetlur et al. | 370/252 |

OTHER PUBLICATIONS

International Preliminary Report on Patentability and Written Opinion received for PCT Patent Application No. PCT/US2013/043527, mailed on Jul. 2, 2015, 9 pages.

Office Action received for U.S. Appl. No. 13/717,049, mailed on May 21, 2015, 19 pages.

Office Action received for Taiwan Patent Application No. 103107488, mailed on Jul. 30, 2015, 5 pages of English translation and 7 pages of Taiwan Office Action.

* cited by examiner

RADIO SPECTRUM TRADING

PRIORITY

The present U.S. Patent Application is a Continuation-in-Part (CIP) of co-pending U.S. patent application Ser. No. 13/717,049 entitled "Cloud Spectrum Management System" having at least one common inventor and a filing date of Dec. 17, 2012. The contents of the above-identified U.S. Patent Application are incorporated herein, in entirety, by reference.

TECHNICAL FIELD

The present disclosure relates to spectrum management, and more particularly, to systems and methods for trading spectrum between spectrum owners and those seeking to lease spectrum.

BACKGROUND

As wireless technology continues to evolve, the number of wireless-enabled devices in the marketplace continues to expand. Not only are devices emerging that are primarily tasked with wireless communication (e.g., cellular handsets, smartphones, etc.), but also applications that did not previously include any form of communication functionality are becoming able to interact wirelessly. For example, vehicles, appliances, heating, ventilation and air conditioning (HVAC) systems, thermostats, manufacturing equipment, security systems, street signs etc. may all be configured to interact wirelessly, with other wireless applications being devised daily.

While the benefits of communication functionality associated with wireless devices may be apparent, an unintended consequence of this wireless explosion is the large amount of traffic that has been created. Wireless communication bandwidth may generally be divided into two categories: regulated spectrum and unregulated spectrum. Regulated spectrum may be reserved for government services (e.g., police, fire, etc.) or licensed to a wireless service provider for use exclusively by their subscribers. Unregulated spectrum may be used by anyone and is typically limited to short-range wireless communication mediums (e.g., Bluetooth, wireless local area networking (WLAN), etc.) in relatively "noisy" bandwidths. It might seem logical that designers would want to use unregulated spectrum whenever possible due to availability, cost savings, etc. While unregulated spectrum may be attractive for some uses, the limitations on its use (e.g., only for short-range wireless communication), interference caused by other signal sources operating in the same spectrum, etc. do not allow it to be a direct replacement for regulated spectrum. On the other hand, the amount of regulated spectrum is very limited, and thus, leasing it may be very costly. Regardless, exponential growth caused by new subscribers is continues to drive demand.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

Figure 1:
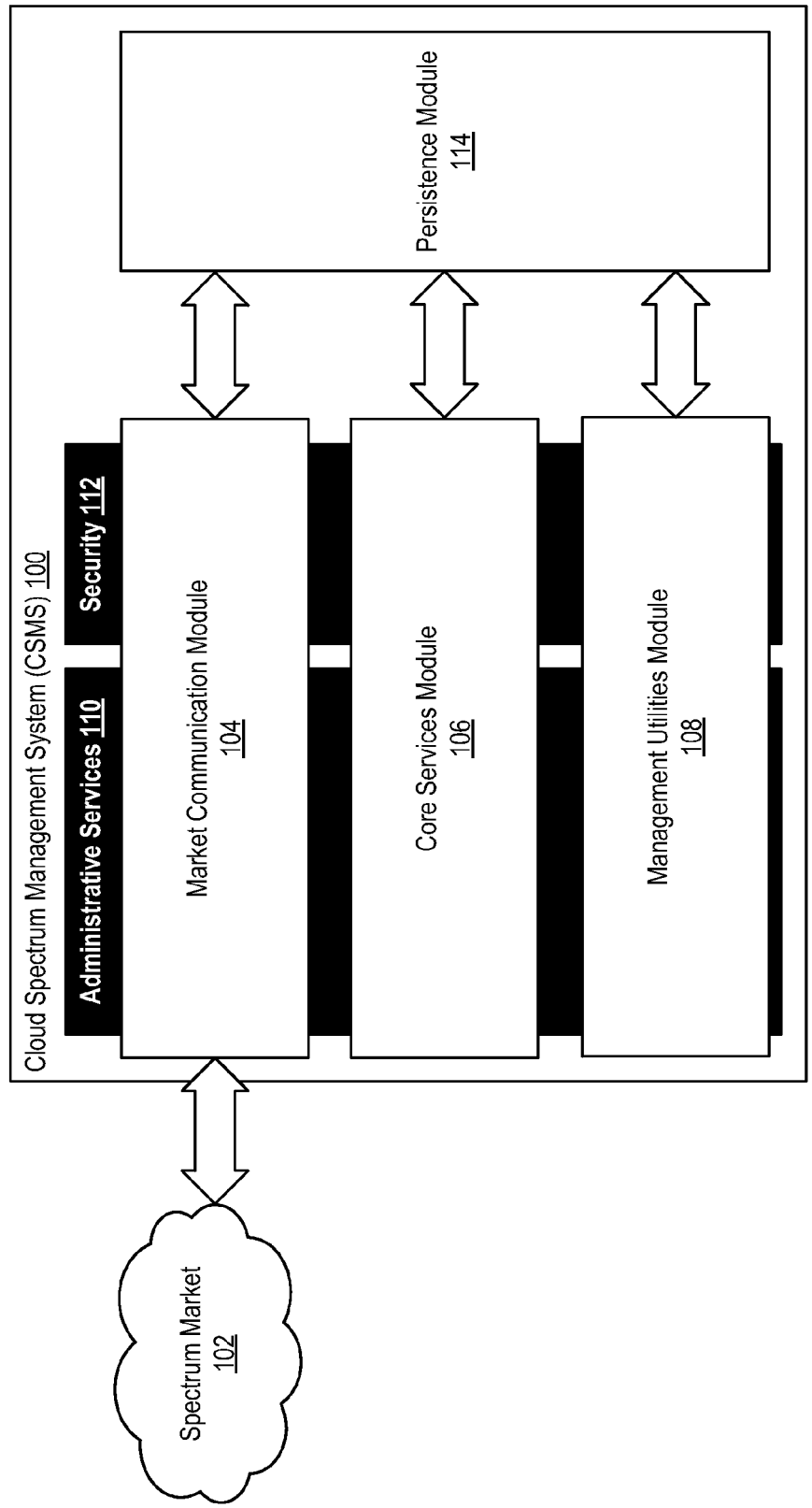
FIG. 1 illustrates an example cloud spectrum management system interacting with a spectrum market in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to a cloud spectrum management system. In general, an example cloud spectrum management system may receive requests from spectrum requestors seeking available radio spectrum and spectrum owners desiring to lease available radio spectrum and/or seeking to reclaim leased radio spectrum. The cloud spectrum management system may accumulate these requests and match spectrum requestor requests with spectrum owners having available radio spectrum to lease. The resulting radio spectrum trade transactions may be carried out by the cloud spectrum management system, which may further monitor the radio spectrum trade transactions to help ensure that they are carried out in accordance with the agreed to terms.

In one embodiment, an example system may include a market communication module to communicate with a marketplace for trading a spectrum of radio frequencies for use in wireless communication, a core service s module to determine radio spectrum trade transactions based at least on the communications between the market communication module and the market, and a management utilities module configured to manage the radio spectrum trade transactions determined by the core services module. The market communication module may comprise, for example, at least one application programming interface (API) to receive information from at least one of spectrum requestors seeking available radio spectrum or spectrum owners desiring to lease available radio spectrum or reclaim leased radio spectrum. The market communication module may further include at least one of a request processor to accumulate the information received from the spectrum requestors and spectrum owners, an event processor to monitor the request processor for events, and a cloud controller to communicate with the core services module (e.g., to forward the spectrum requests received from the spectrum market).

An example core services module may comprise a real-time trading engine to receive the accumulated information from the market information module and an analytics engine utilizing at least one of a multi-objective optimization engine or a cognitive engine to determine the radio spectrum trade transactions based at least on the accumulated information. In one embodiment, the multi-objective engine may be to at least one of maximize revenues for the spectrum owners, ensure quality of service for the spectrum requestors or maximize radio spectrum utilization. while the cognitive engine may comprise machine learning algorithms to forecast predicted spectrum usage. In determining the radio spectrum trade transactions, the analytics engine may interact with at least one of a match-making engine, a rules-based engine, a negotiation broker, a time frequency unit (TFU) allocation engine, a broker-agent interface or a spectrum transaction management engine. In the same or a different embodiment, the management utilities module may comprise an order management processor to carry out the radio spectrum trade transactions. The management utilities module may also comprise a service level agreement (SLA) manager to ensure that terms agreed to in the radio spectrum trade transaction carried out by the order management processor are met by the spectrum requestors and spectrum owners.

In the same or a different embodiment, the system may comprise a persistence module comprising at least one database. The database may be to store information related to at least one of radio spectrum availability, radio spectrum characteristic information, radio spectrum geographical information and historical radio spectrum trade transaction information. A method consistent with at least one embodiment of the present disclosure may comprise, for example, receiving requests seeking available spectrum from a market for trading a spectrum of radio frequencies for use in wireless communication, matching the requests seeking available spectrum with the requests offering to lease spectrum to form radio spectrum trade transactions, and supervising execution of the radio spectrum trade transactions.

FIG. 1 illustrates example cloud spectrum management system (CSMS) 100 interacting with spectrum market 102 in accordance with at least one embodiment of the present disclosure. "Radio spectrum," as referenced herein, may comprise portions of the electromagnetic spectrum including radio frequencies usable for conducting wireless communication. Portions of the radio spectrum may be licensed regionally to certain entities (e.g., wireless service providers) for their exclusive use. Entities that may own exclusive licenses to use portions of the radio spectrum are referred to herein as spectrum owners. Spectrum requestors may be entities that seek permission to temporarily utilize portions of regulated bandwidth owned by spectrum owners. For example, a spectrum requestor may be wireless service provider that is realizing heavy traffic within its own licensed spectrum and is seeking additional spectrum to reduce bottlenecking and increase quality of service for its customers. In another example, a spectrum requestor may be a wireless service provider that doesn't own any licensed spectrum and leases spectrum from spectrum owners only for planned events (e.g., teleconference, video broadcast conducted over a wide area network (WAN) like the Internet, lecture, symposium, musical or theatrical performance etc.).

CSMS 100 may communicate with spectrum market 102 to facilitate radio spectrum trade transactions between spectrum requestors and spectrum owners. In this regard, CSMS 100 may also be referred to as a "broker" in that it may broker available radio spectrum between spectrum requestors and spectrum owners. During operation, CSMS 100 may communicate with spectrum requestors and spectrum owners directly, or with another CSMS 100 existing in spectrum market 102 to determine spectrum requirements and available spectrum to fulfill the requirements. It is therefore possible for CSMS 100 to interact with another CSMS 100 in spectrum market 102 to determine what requirements/availability exist within the other CSMS 100, and to broker a deal between spectrum requestors and spectrum brokers associated with different broker systems.

CSMS 100 may comprise, for example, at least market communication module 104, core services module 106 and management utilities module 108. The modules may be customized and/or configured via administrative services 110 and may be protected by security 112 using various known or to be developed methods and/or mechanisms including, for example, access control, privacy protection, data theft prevention, etc. Information may be stored in persistence module 114 and may be accessible to each of these three modules. Initially, a function of market communication module 104 may be to interact with spectrum market 102. This interaction may include exchanging information related to spectrum requestors, spectrum owners and the current conditions in spectrum market 102. The information resulting from this exchange may then be provided to core services module 106, which may employ the information along with, for example, historical or statistical information derived from persistence module 114 to determine radio spectrum trade transactions. Radio spectrum trade transactions may involve a spectrum owner agreeing to temporarily lease (e.g., for a certain time period or a certain amount of data) available radio spectrum to a spectrum requestor. The radio spectrum trade transactions determined by core services module 106 may then be provided to management utilities module 108 to carry out the radio spectrum trade transactions (e.g., to formalize the temporary transfer of usage rights, to initiate payments, etc.) and to monitor performance of the spectrum requestor and spectrum owner to ensure that the terms of the radio spectrum trade transaction are honored.

Administrative services 110 and security 112 may act as "cross layers" binding market communication module 104, core services module 106 and management utilities module 108 together. These cross layers may provide administration over the entire spectrum management process to authenticate spectrum holders and verify the eligibility of spectrum requestors and spectrum holders to participate in the brokerage process. Administrative services 110 and security 112 may also facilitate creation and enforcement of rules governing how CSMS 100 operates.

Figure 2:
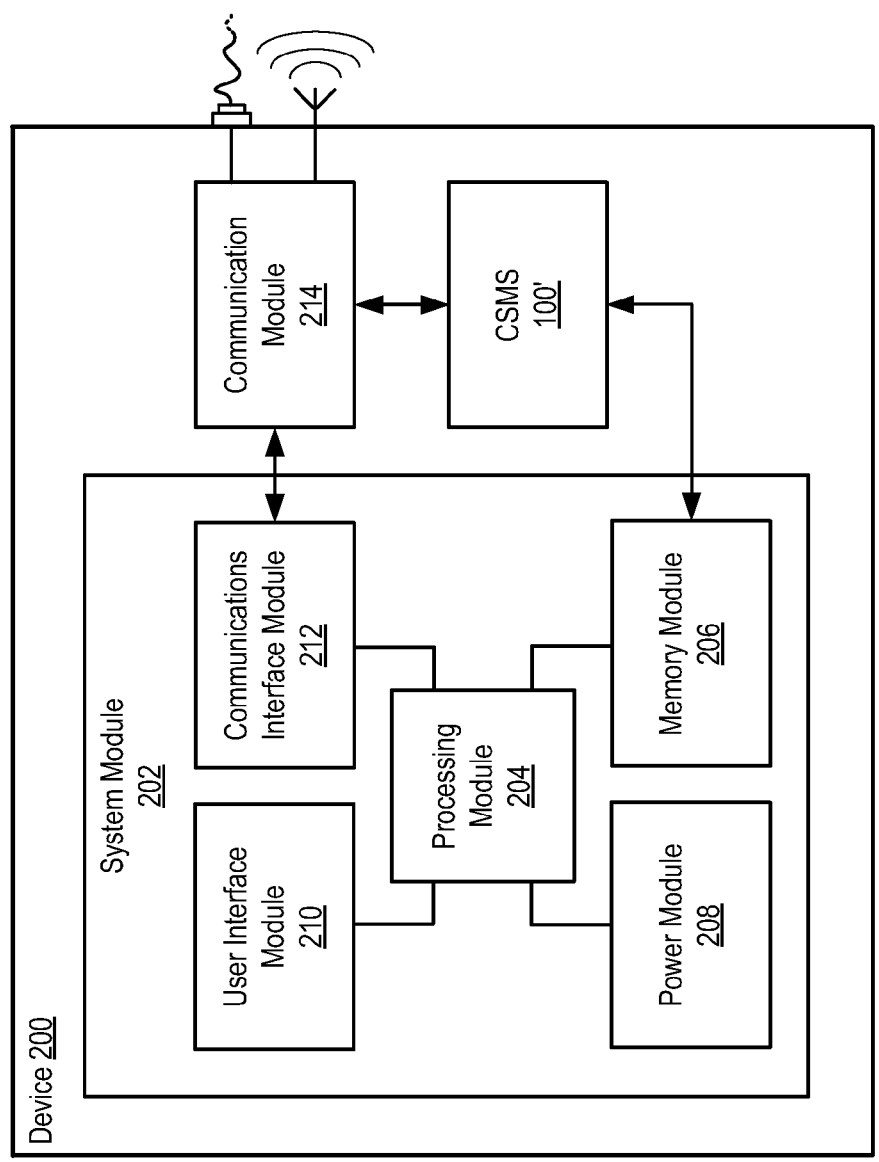
FIG. 2 illustrates an example configuration for a device usable in accordance with at least one embodiment of the present disclosure.

FIG. 2 illustrates an example configuration for device 200 usable in accordance with at least one embodiment of the present disclosure. Device 200 presents an example of equipment that may be used to implement some or all of CSMS 100 as illustrated in FIG. 1. For example, CSMS 100 may be implemented in part or in whole in a "cloud" configuration including one or more servers, storage devices, network equipment, etc. accessible via a WAN (e.g., the Internet) comprising the modules illustrated in FIG. 1. The one or more cloud servers may, for example, comprise features such as described with respect to device 200. Moreover, while some portions of CSMS 100 may be implemented in a cloud configuration, other portions may reside with the different possible participants in spectrum market 102. For example, some or all of the modules described in FIG. 1 may reside with spectrum requestors and/or spectrum owners (e.g., wireless service providers), with a third party operators of CSMS 100 such as a private or governmental spectrum regulatory authority, etc. It may also be possible to implement all aspects of CSMS 100 on the same device 200. Regardless, device 200 is meant only as an example of equipment usable in accordance with various embodiments consistent with the present disclosure, and is not meant to limit these various embodiments to any particular manner of implementation.

Device 200 may comprise system module 202 configured to generally manage device operations. System module 202 may include, for example, processing module 204, memory module 206, power module 208, user interface module 210 and communication interface module 212 that may be configured to interact with communication module 214. Device 200 may also include CSMS 100' configured to interact with at least memory module 206 and communication module 214. While CSMS 100' and communication module 214 are shown separate from system module 202, this is merely for the sake of explanation herein. Some or all of the functionality associated with CSMS 100' and/or communication module 212 may also be incorporated within system module 202.

In device 200, processing module 204 may comprise one or more processors situated in separate components, or alternatively, may comprise one or more processing cores embodied in a single component (e.g., in a System-on-a-Chip (SOC) configuration) and any processor-related support circuitry (e.g., bridging interfaces, etc.). Example processors may include various x86-based microprocessors available from the Intel Corporation including those in the Pentium, Xeon, Itanium, Celeron, Atom, Core i-series product families. Examples of support circuitry may include chipsets (e.g., Northbridge, Southbridge, etc. available from the Intel Corporation) configured to provide an interface through which processing module 204 may interact with other system components that may be operating at different speeds, on different buses, etc. in device 200. Some or all of the functionality commonly associated with the support circuitry may also be included in the same physical package as the processor (e.g., an SOC package like the Sandy Bridge integrated circuit available from the Intel Corporation).

Processing module 204 may be configured to execute various instructions in device 200. Instructions may include program code configured to cause processing module 204 to perform activities related to reading data, writing data, processing data, formulating data, converting data, transforming data, etc. Information (e.g., instructions, data, etc.) may be stored in memory module 206. Memory module 206 may comprise random access memory (RAM) or read-only memory (ROM) in a fixed or removable format. RAM may include memory configured to hold information during the operation of device 200 such as, for example, static RAM (SRAM) or Dynamic RAM (DRAM). ROM may include memories such as bios memory configured to provide instructions when device 200 activates, programmable memories such as electronic programmable ROMs (EPROMS), Flash, etc. Other fixed and/or removable memory may include magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), etc. Power module 208 may include internal power sources (e.g., a battery) and/or external power sources (e.g., electromechanical or solar generator, power grid, etc.), and related circuitry configured to supply device 200 with the power needed to operate.

User interface module 210 may include circuitry configured to allow users to interact with device 200 such as, for example, various input mechanisms (e.g., microphones, switches, buttons, knobs, keyboards, speakers, touch-sensitive surfaces, one or more sensors configured to capture images and/or sense proximity, distance, motion, gestures, etc.) and output mechanisms (e.g., speakers, displays, lighted/flashing indicators, electromechanical components for vibration, motion, etc.). Communication interface module 212 may be configured to handle packet routing and other control functions for communication module 214, which may include resources configured to support wired and/or wireless communications. Wired communications may include serial and parallel wired mediums such as, for example, Ethernet, Universal Serial Bus (USB), Firewire, Digital Visual Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular, satellite, etc.). In one embodiment, communication interface module 212 may be configured to prevent wireless communications that are active in communication module 214 from interfering with each other. In performing this function, communication interface module 212 may schedule activities for communication module 214 based on, for example, the relative priority of messages awaiting transmission.

In one embodiment, CSMS 100' may comprise software and/or hardware configured to include some or all of the functional elements described in FIG. 1. It is also possible for some of the functional elements illustrated in FIG. 1 to be situated in other devices configured to interact with CSMS 100' via wired or wireless communication (e.g., in a distributed or cloud topology). For example, CSMS 100' may interact with memory module 206 to store information in, and retrieve information from, databases such as in persistence module 114. Moreover, CSMS 100' may also interact with communication module 214 when communicating with spectrum market 102, with other CSMS 100' situated in different geographic regions, etc. While not shown in FIG. 2, it may also be possible for CSMS 100' to interact with other modules in device 200 including, for example, processing module 204 to execute instructions associated with CSMS 100', with user interface module 210 to receive commands from an operator of CSMS 100', to display information in regard to CSMS 100', to issue visible/audible alerts, etc.

Figure 3:
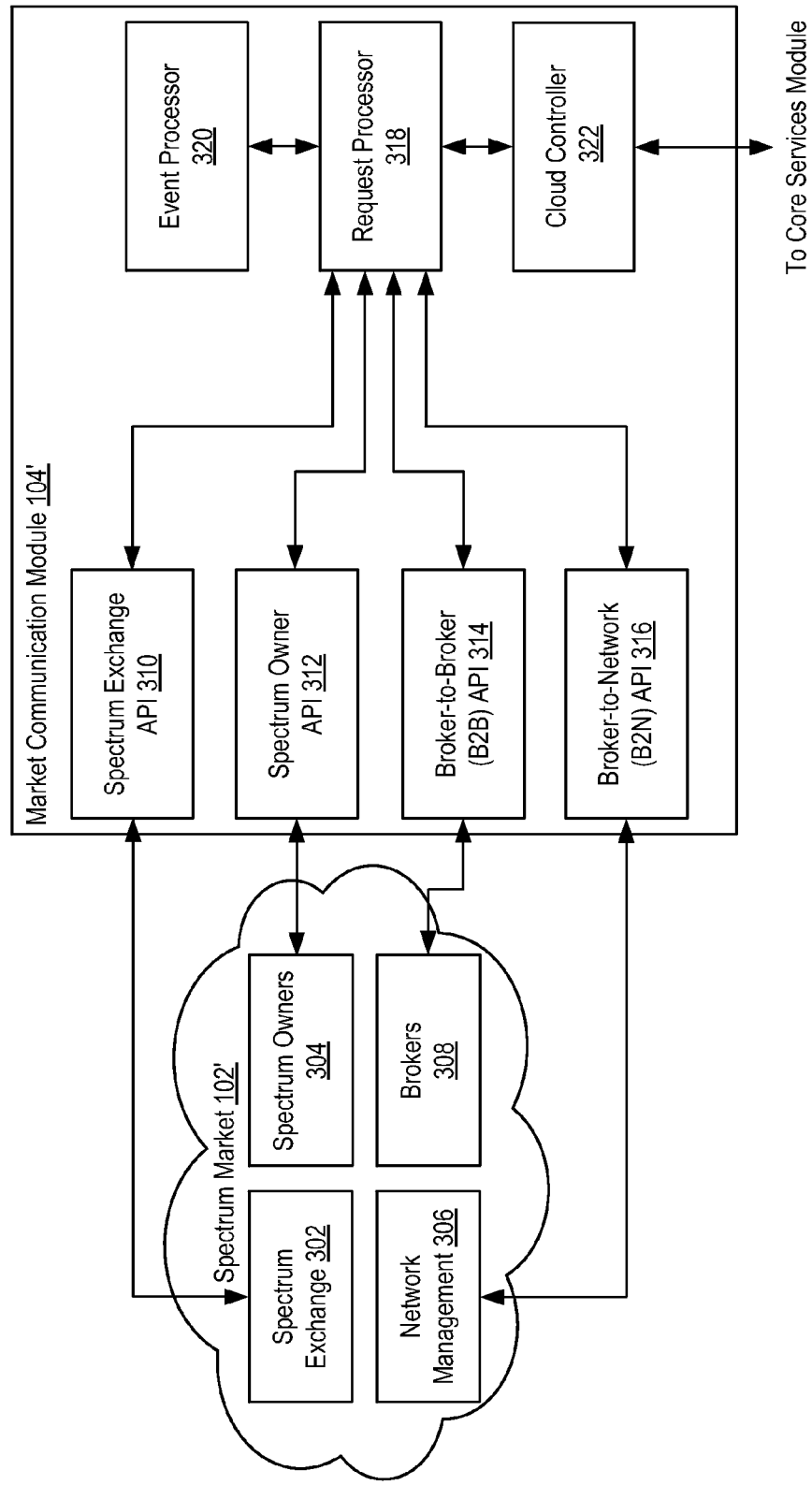
FIG. 3 illustrates an example configuration for a market communication module in accordance with at least one embodiment of the present disclosure.

FIG. 3 illustrates an example configuration for market communication module 104' in accordance with at least one embodiment of the present disclosure. Market communication module 104' may comprise various APIs configured to interact with spectrum market 102' and further elements to monitor/process information received from these APIs. Spectrum exchange API 310 may provide an interface to spectrum exchange 302 in spectrum market 102' to update and/or maintain status for spectrum market 102'. For example, spectrum exchange API 310 may make dynamic bindings with the operators of CSMS 100 and spectrum holders participating in CSMS 100, may perform clearance operations and payment management, etc. Spectrum Owner API 312 may provide an interface over which spectrum owners 304 in spectrum market 102' may communicate with CSMS 100 (e.g., to lease available radio spectrum, to reclaim leased radio spectrum, etc.). Broker-to-broker (B2B) API 314 may provide an interface over which brokers 308 (e.g., including at least one other CSMS 100) in spectrum market 102' to interact with CSMS 100. Broker-to-network (B2N) API 316 may provide an interface by which network management 306 in spectrum market 102' may communicate with CSMS 100. For example, B2N 316 may make it easier for CSMS 100 to communicate with other network components in the wireless networking infrastructure encompassed by spectrum market 102'.

Request processor 318 may be to process information received in market communication module 104' from APIs 310 to 316. For example, request processor 318 may receive requests from spectrum requestors seeking available radio spectrum, lease offers from spectrum owners seeking to lease available spectrum, requests to reclaim leased spectrum from spectrum owners that have leased spectrum but are now experiencing unexpected demand, and similar information from other brokers (e.g., at least one other CSMS 100). In processing this information request processor 318 may collate types of information, aggregate similar requests/offers, filter certain types of information, organize the information for later processing, etc. Event processor 320 may monitor the information received by request processor 218 to look for particular events (e.g., trends, values, types of information, etc.). For example, event processor 318 may detect an increase in spectrum orders, may detect a trigger indicating increased order congestion, etc. If an event is detected, event processor 320 may, for example, cause certain functionality to occur in CSMS 100 (e.g., to alleviate congestion), cause an alert to be presented to operators of CSMS 100, etc. Cloud controller 322 may communicate with core services module 106. For example, cloud controller 322 may provide the information processed by request processor 318 to core services module 106 and may request processing of radio spectrum trade transactions.

Figure 4:
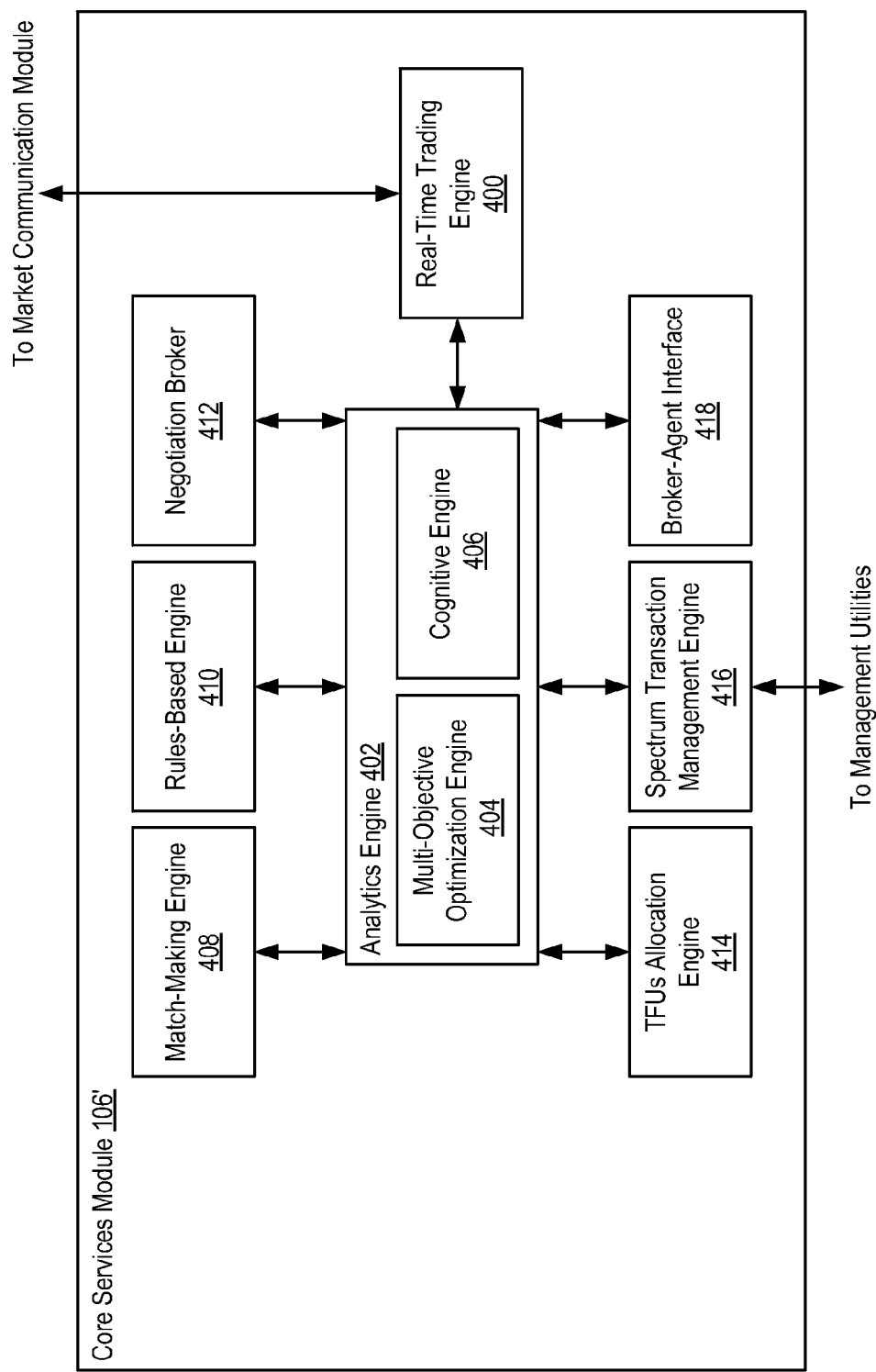
FIG. 4 illustrates an example configuration for a core services module in accordance with at least one embodiment of the present disclosure.

FIG. 4 illustrates an example configuration for core services module 106' in accordance with at least one embodiment of the present disclosure. Real time trading engine 402 may be responsible for the trading of radio spectrum, wherein spectrum requestors are matched with spectrum owners. In one embodiment, radio spectrum may be traded in time frequency units (TFU). Determining the spectrum requesters to match with the spectrum owners may be based on a multitude of criteria. Real-time trading engine 400 may receive input from analytics engine 402 in this regard. Analytics engine 402 may include, for example, multi-objective optimization engine 404 and cognitive engine 406. In one embodiment, multi-objective optimization engine 404 may include one or more optimization algorithms used by analytics engine 402 to fulfill the objective of spectrum trading in terms of, for example, maximizing the revenue for the spectrum holders, ensuring the quality of service and performance for spectrum lessors, maximizing spectrum utilization and optimum allocation, etc. These objectives may be performed based criteria such as, for example, radio context info, application requirements, device mobility models, wireless traffic requirements, power levels, spectrum availability, geographic location, spectrum rentals offers/requests, etc. Cognitive engine 406 is also important to the operation of analytics engine 402 in that it may be composed of a set of machine learning algorithms that use spectrum usage patterns along with historical information to attempt to predict and forecast the usage of radio spectrum (e.g., at particular times, locations, etc.). For example, video conference calls may be made on a regular basis (time and location), cognitive engine 406 may identify the pattern of radio spectrum usage to help in forecasting the allocation of radio spectrum needs to make the video call in a smooth and proper way with the required quality.

Other elements in core services module 106' may provide information useful to analytics engine 403 for determining the best pairings between spectrum requestors and spectrum owners. For example, match-making engine 408 may help to determine matches between TFUs available for trading according to price (e.g., bid and ask prices) and geographical location of the available radio spectrum. Rules-based engine 410 may be responsible for establishing TFU trading rules and brokerage criteria to help develop an efficient, customizable trading and brokerage system. Negotiation broker 412 may help to select a strategy (e.g., from a selection of predetermined strategies based on, for example, historical performance information). The strategy may dictate how certain bargaining situations may be handled automatically including, for example, initial price/TFU offers, counter offers, offer acceptance, unfulfilled requirement handling, etc. TFUs allocation engine 414 may operate to gather information related to settled trading operations in terms of, for example, the amount of available spectrum that was leased, the duration of usage for the available spectrum, the price/TFU at which the available spectrum is being leased, etc. TFUs allocation engine 414 may also collect information related to the available spectrum that was leased including, for example, frequency bands, radio interface, power levels, etc., which may be communicated to the entity that leased the spectrum (e.g., wireless service provider) as part of a transaction to start the actual scheduling and allocation of the available spectrum. Spectrum transaction management engine 416 may collect, store, modify, retrieve, etc. radio spectrum trade transactions, and thus, may interact with management utilities module 108. For example, spectrum transaction manage engine 416 may ensure that the trading experience is consistent and atomic for all parties (e.g., spectrum requestors and spectrum owners), and may also orchestrate "roll-backs" wherein leased spectrum is returned to the spectrum owner based on certain situations including, for example, the spectrum requester not acting in accordance with the terms of the radio spectrum trading transaction (e.g., not paying for the leased spectrum, not using the leased spectrum in accordance with limitations set forth by the spectrum owner) or the spectrum owner needing to reclaim the spectrum (e.g., due to unforeseen traffic increases, for emergency needs, etc.). Broker-Agent interface 418 may provide an interface into core services module 106' to, for example, allow other brokers to determine trading characteristics (e.g., for standardization, etc.).

Figure 5:
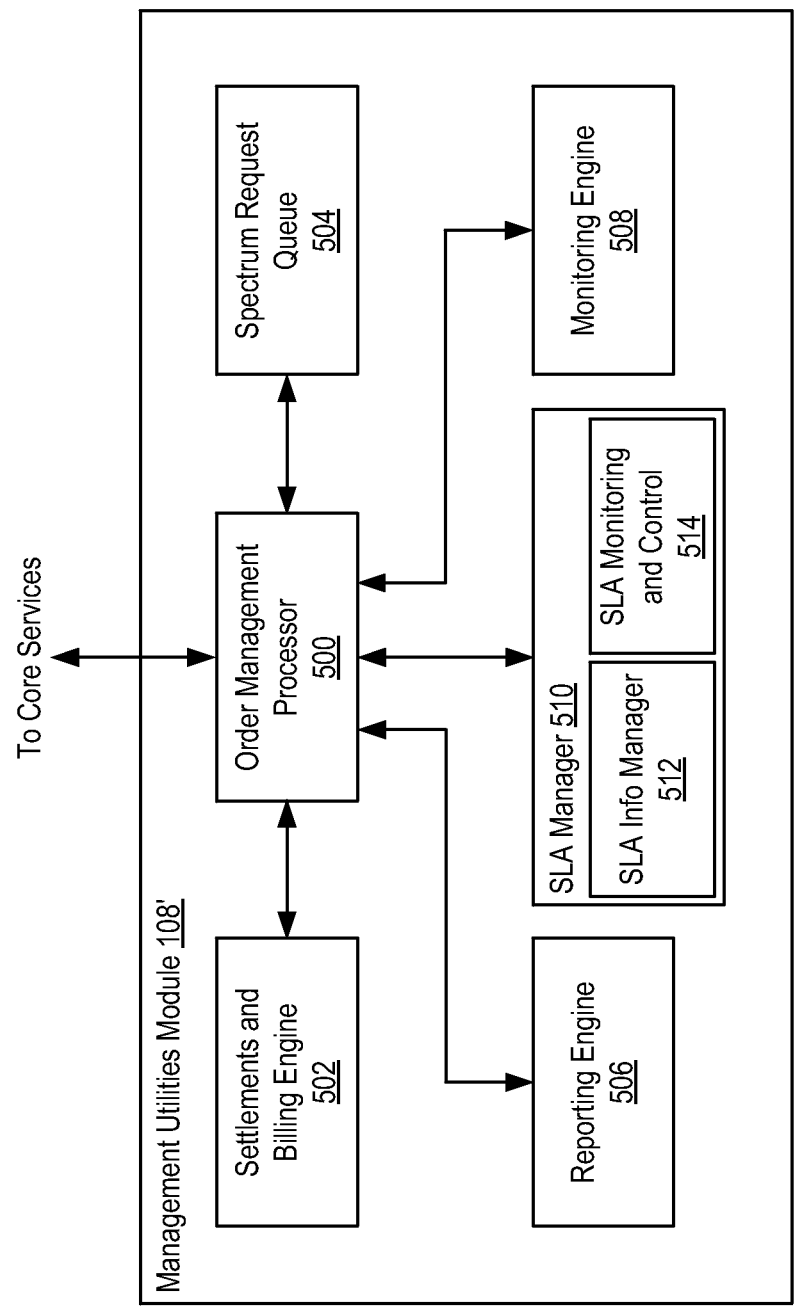
FIG. 5 illustrates an example configuration for a management utilities module in accordance with at least one embodiment of the present disclosure.

FIG. 5 illustrates an example configuration for a management utilities module 108' in accordance with at least one embodiment of the present disclosure. Initially, order management processor 500 may receive radio spectrum trade transactions from core services module 106. In one embodiment, order management processor 500 may review the incoming radio spectrum trade transactions for accuracy and/or errors. Settlements and billing engine 502 may then take care of billing the appropriate entity (e.g., the spectrum requestor) for the leased spectrum and crediting the proceeds to the spectrum owner. Reporting engine 506 may report statistics for CSMS 100 including, for example, the volume of transactions, the type of transactions, amounts of completed/rolled-back transactions, geographic spectrum leasing statistics, etc. Monitoring engine 506 may operate to generally monitor CSMS 100 and alert the operators of CSMS 100 as to any anomalies or problems with the system. Service Level Agreement (SLA) manager 510 may be to monitor completed radio spectrum trade transactions at least in regard to the adherence of both parties to the agreed upon terms and conditions. SLA manager 510 may comprise, for example, SLA information manager 512 and SLA monitoring and control 514. SLA information manager 512 may keep track of the terms for active radio spectrum trade transactions. For example, SLA information manager 512 may include settings for standardized terms such as least start time, lease duration, lease frequencies, lease geographic limitations, power restrictions, etc. SLA monitoring and control 514 may then monitor the performance of both the spectrum requestor and the spectrum owner to ensure that the terms are met. If terms are violated, SLA monitoring and control 514 may automatically take action including, for example, transmitting notifications to the spectrum requestor, spectrum owner and/or the operators of CSMS 100, rolling back the radio spectrum trade transaction, refunding payments made in the radio spectrum trade transaction, discontinuing trading for the spectrum requestor and/or spectrum owner, etc.

Figure 6:
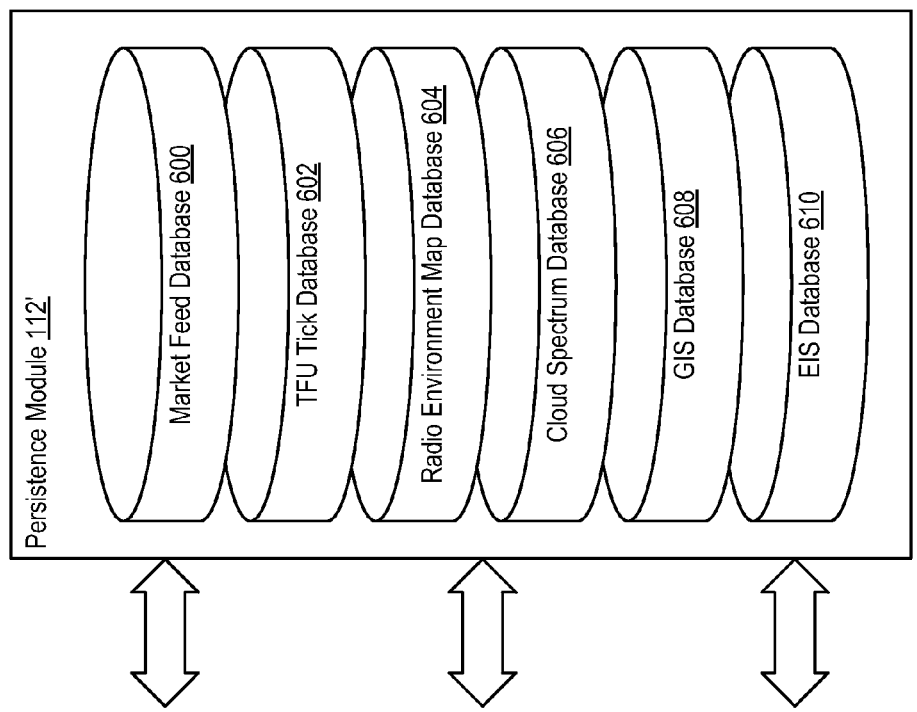
FIG. 6 illustrates an example configuration for a persistence module in accordance with at least one embodiment of the present disclosure.

FIG. 6 illustrates an example configuration for persistence module 112 in accordance with at least one embodiment of the present disclosure. Persistence module 112' may include one or more databases configured to store information related to spectrum trade market 102 and radio spectrum trade transactions. While various example databases are illustrated in FIG. 6 for the sake of explanation herein, various embodiments consistent with the present disclosure are not limited only to these databases, and may include more or less databases storing other data.

Market feed database 600 may include data about the condition of spectrum market 102 such as, for example, market status, market news, announcements about the availability of radio spectrum, etc. TFU tick database 602 may include snapshots (e.g., real-time) of the allocation and/or de-allocation of TFUs. This information may allow brokers to have an instant and precise status about the availability of radio spectrum to be rented to spectrum requestors or to be reclaimed by the spectrum owners. Radio environment map database 604 may include domain environmental information from cognitive radios (e.g., wireless radios able to sense information about their operation, environment, interference, etc. and to change their operation accordingly). This information may include geographical features, available networks and services, spectrum policies and regulations, locations and activities of neighboring/encountered radios, experiences, etc. Radio environment map database 604 may be used by, for example, cognitive engine 406 to learn from past experiences, context awareness, reasoning and to forecast the allocation of proper channels for end users. Cloud spectrum database 606 may include data pertaining to spectrum availability in terms of, for example, available channels (e.g., radio spectrum), schedule of using the channels, coverage parameters, location (latitude and longitude), price per TFU, maximum power levels and spectrum license (licensed or unlicensed). Geographical information system (GIS) database 608 may include information about geographical features and/or boundaries such as, for example, roads, railroads, intersections, traffic conditions etc. This type of information may be usable by analytics engine 402 as available spectrum may be identified based on location and time. Enterprise information system (EIS) database 610 may capture historical information pertaining to radio spectrum trade transactions, payments, orders etc. The information in EIS database 610 may be used to, for example, determine historical trends, predict performance, identify potential problem locations and/or times, perform system reporting for CSMS 100, etc.

Figure 7:
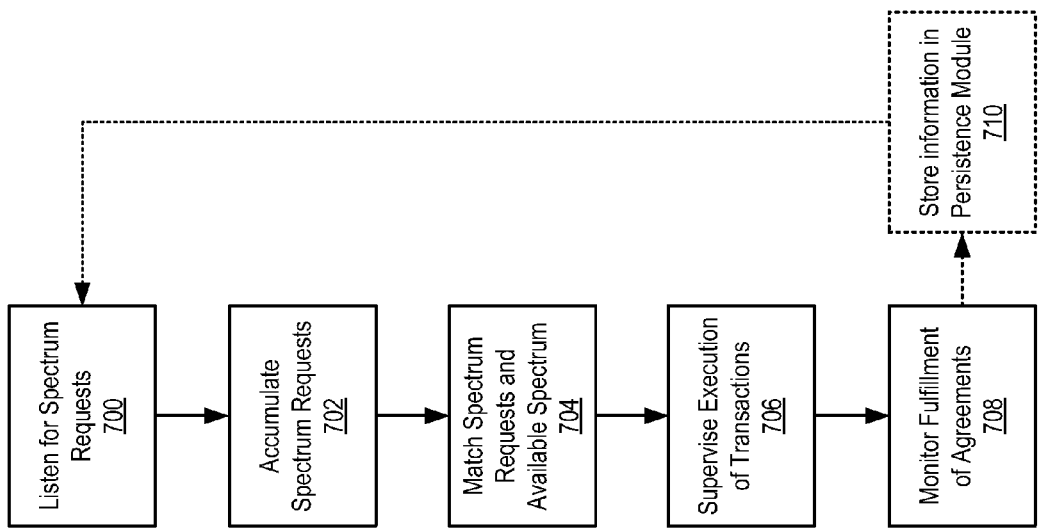
FIG. 7 illustrates example operations related to a cloud spectrum management system in accordance with at least one embodiment of the present disclosure.

FIG. 7 illustrates example operations related to a cloud spectrum management system in accordance with at least one embodiment of the present disclosure. In operation 700 a CSMS may listen for spectrum requests. For example, a market communication module may interact with a spectrum market to receive requests from spectrum requestors seeking available radio spectrum and spectrum owners desiring to lease available radio spectrum or to reclaim leased radio spectrum. These requests may be accumulated in operation 702 prior to matching being performed wherein spectrum requests may be matched to available radio spectrum in operation 704. Operation 704 may be performed by, for example, a core services module in the CSMS.

The matching performed in operation 704 may result in one or more radio spectrum trade transactions, the execution of which may be supervised in operation 706. For example, in one embodiment management utilities in the CSMS may ensure that the leased spectrum is reserved for the spectrum requestor and that the spectrum owner is compensated in accordance with the terms of the radio spectrum trade transaction. In operation 708 the radio spectrum trade transactions may be monitored to ensure that the terms agreed to by the participants (e.g., the spectrum requestor and the spectrum owner) are fulfilled. In operation 710, information may be stored in a persistence module related to the transaction. Operation 710 may be optional (e.g., dotted line) in that whether information is stored depends on whether there is a corresponding database in the persistence module to accept the data. Operation 710 may then be followed by an optional return to operation 700 in preparation for the reception of additional spectrum requests.

Radio Spectrum Trading

The following disclosure describes exemplary systems and methods for radio spectrum trading that may be implemented using, for example, equipment such as previously described above in association with various embodiments consistent with the present disclosure. However, the following systems and methods are not intended to be limited to implementation using only the equipment set forth above. References made to any of the above features are merely for the sake of explanation herein. Systems and methods for radio spectrum trading such as described below may, in actuality, be implemented using any combination of equipment and software that is configurable to support the following disclosed example functionality, operations, etc.

In general, radio spectrum trading may include systems and methods for determining an available pool of radio spectrum and requestors desiring to lease portions of the available pool of radio spectrum, and for allocating the available spectrum to the requestors. A pricing curve may be set based on historical information and/or requests to lease spectrum made by the requestors. A determination may then be made as to whether an amount of available spectrum is less than or greater than an amount spectrum being requested. If it is determined that the amount of available spectrum is less than the amount of spectrum being requested, then an auction may be conducted for the available spectrum with the initial bid being set based on the pricing curve. If the amount of available spectrum is greater than the amount of spectrum being requested, then the requestors may be sorted based on a predicted amount of revenue that will be generated from their requests and the available spectrum may be allocated in order from highest to lowest revenue generated.

In one embodiment, an example system may comprise at least a core services module to determine radio spectrum trade transactions for trading a spectrum of radio frequencies for use in wireless communication. An example core services module may include an analytics engine and a real-time trading engine. The analytics engine may be to, for example, set a pricing curve based on usage data. The real-time trading engine may be to, for example, determine spectrum availability in view of spectrum requests received from requestors desiring to lease available spectrum and to allocate available spectrum to fulfill the spectrum requests based on the spectrum availability determination and the pricing curve.

In setting the pricing curve based on usage data, the analytics engine may be to determine if historical usage data is available and, if it is determined that the historical usage data is not available, to set the pricing curve based on predetermined usage data. On the other hand, if the analytics engine determines that the historical usage data is available, the analytics engine may be to determine future probability for receiving spectrum requests requesting at least one of certain spectrum quantity or certain lease duration, the future probability determination being based on at least one of the historical usage data and the spectrum requests. The analytics engine may then further be to determine future revenue estimates based on the future probability and may proceed to set the pricing curve based on the future revenue estimates.

The determination of spectrum availability by the real-time trading engine may comprise the real-time trading engine being to determine if an amount of available spectrum is greater than an amount of spectrum requested in the spectrum requests. If it is determined that the amount of available spectrum is less than the amount of spectrum requested in the spectrum requests, then the real-time trading engine may further be to allocate available spectrum to fulfill the spectrum requests by auctioning the available spectrum based on bids submitted by the requestors. The available spectrum may then be allocated based on a highest bid to a lowest bid received during the auction. In one embodiment, the real-time trading engine may further be to set an initial bid based on a minimum price determined from the pricing curve plus an empirical gap value. Alternatively, if it is determined that the amount of available spectrum is greater than the amount of spectrum requested in the spectrum requests, then the real-time trading engine may further be to allocate available spectrum to fulfill the spectrum requests sorting the spectrum requests by predicted revenue generation and allocating the available spectrum based on the sorting. The predicted revenue determined for each spectrum request may, for example, be based at least on the pricing curve. A method consistent with at least one embodiment of the present disclosure may include, for example, setting a pricing curve based on usage data, the pricing curve being usable for trading a spectrum of radio frequencies for use in wireless communication, determining spectrum availability in view of spectrum requests received from requestors desiring to lease available spectrum, and allocating the available spectrum to fulfill the spectrum requests based on the spectrum availability determination and the pricing curve.

FIGS. 8, 10 and 12-13 describe example operations that may be encompassed within the matching of spectrum requests and available spectrum as set forth in operation 704. Initially, it is important to note that the example operations disclosed in FIGS. 8, 10 and 12-13 may correspond to a variety of geographic regions. The variety of geographic regions may be similar or disparate in their characteristics (e.g., the number of wireless users, the number of wireless providers, the economic status of the users, the average charges leveraged by providers, etc.). As a result, the manner in which operations disclosed in FIGS. 8, 10 and 12-13 are carried out may vary depending on the characteristics of the geographic regions being serviced. For example, geographic regions that are very different may require separate processing. Thus, the operations described in FIGS. 8, 10 and 12-13 may be carried out individually on a region-to-region basis. Alternatively, if regions have very similar characteristics, a centralized processing scheme may be used to simultaneously process radio spectrum trading for a plurality of regions (e.g., the plurality of regions may share some information used in the processing of spectrum transactions like a common pricing curve).

Figure 8:
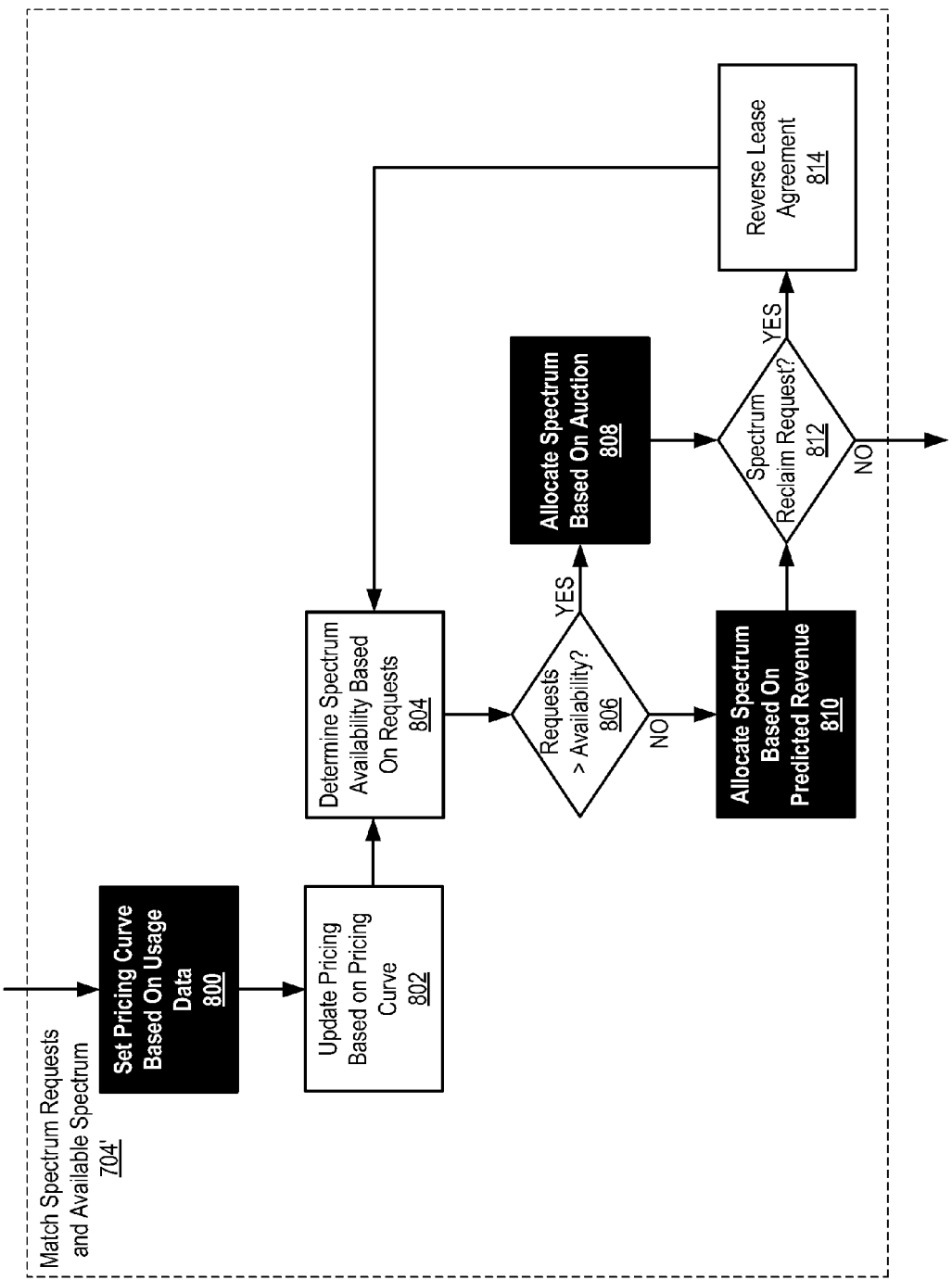
FIG. 8 illustrates example operations related to radio spectrum trading in accordance with at least one embodiment of the present disclosure.

FIG. 8 illustrates example operations related to radio spectrum trading in accordance with at least one embodiment of the present disclosure. FIG. 8 provides further detail as to what may operations be encompassed in matching spectrum requests and available spectrum. Operations that have been illustrated in inverse (e.g., operations 800, 808 and 810) will be explained further in FIGS. 10, 12 and 13, respectively. In operation 800, a pricing curve may be set based on usage data. In general, the pricing curve may serve as a basis for determining potential revenue that may be generated from requests, for setting an initial bid for use in radio spectrum auctions, etc. In one embodiment, the pricing curve may be used to update pricing in operation 802. Pricing may be updated based on, for example, comparing existing spectrum market pricing (e.g., global pricing or pricing by geographic region) to the pricing curve and adjusting pricing accordingly.

Setting the pricing curve may be followed by determining spectrum availability based on requests to lease spectrum received from requestors in operation 804. For example, the amount of spectrum made available for lease by spectrum owners may be compared to the amount of spectrum requested in lease requests submitted by requestors (e.g., wireless service providers). In one embodiment, requests may include an amount of spectrum (e.g., bandwidth), an amount of time desired to lease the spectrum (e.g., lease period) and a bid. The bid may be received in terms of a lump sum, an amount per time period (e.g., per minute), conditional amounts (e.g., a higher bid for a specific bandwidth of radio spectrum and/or lease period with a lessor amount for less bandwidth and/or a shorter lease period), etc. A determination may then be made in operation 806 as to whether the amount of spectrum requested is greater than the amount of available spectrum. If it is determined in operation 806 that the amount of spectrum requested is greater than the amount of available radio spectrum, then in operation 808 the available spectrum may be allocated based on an auction. For example, bids may be solicited from requestors based on an initial bid determined based on the pricing curve, and available spectrum may be allocated to requestors based on the highest bid to the lowest bid. Alternatively, if in operation 806 it is determined that the amount of available spectrum is greater than the amount of bandwidth being requested, the available spectrum may be allocated based on predicted revenue generation from each request in operation 810. For example, revenue may be predicted for each request, and the available spectrum may be allocated based on the highest to lowest amount of predicted revenue.

Either operation 808 or 810 may then be followed by operation 812 wherein a further determination may be made as to whether previously leased spectrum is being reclaimed by the spectrum owner. For example, lease provisions may include that circumstances may exist such as, for example, public emergency, high wireless communication demand or even just by choice, that spectrum owners may reclaim leased spectrum. In such an instance, a lease agreement may be reversed (e.g., the leased spectrum may be returned to the spectrum owner and/or the charges to the spectrum requestor may be refunded) in operation 814. Reversal of the lease agreement may then be followed by a return to operation 804 wherein it may again be determined whether there is more available spectrum or spectrum requests so that a new spectrum lease agreement may be arranged for any requestors that were forced to relinquish their previous spectrum leases.

Figure 9:
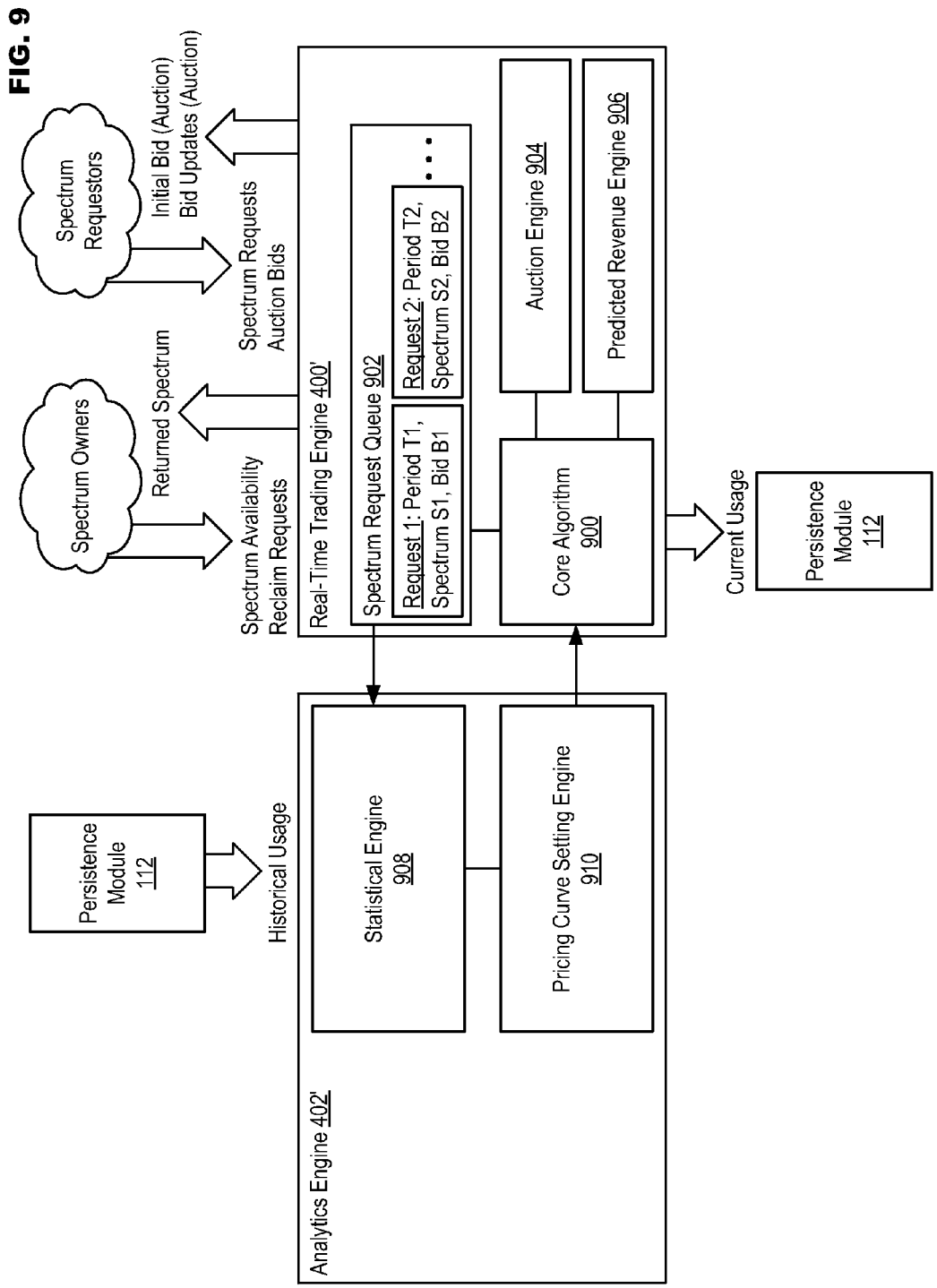
FIG. 9 illustrates an example real-time trading engine and analytics engine in accordance with at least one embodiment of the present disclosure.

FIG. 9 illustrates example real-time trading engine 400' and analytics engine 402' in accordance with at least one embodiment of the present disclosure. In one embodiment, trading engine 400' may be responsible for a variety of actions including, but not limited to, processing spectrum requests and auction bids, continuously allocating and/or reclaiming spectrum, logging current usage information (e.g., resource attributes, spectrum usage, utilization periods, etc.) into a resource utilization database (e.g., in persistence module 112), determining a minimum lease price or prices (e.g., corresponding to different frequencies of spectrum, wherein frequencies of spectrum having a higher demand may have a higher base price than lower-demand frequencies) and adjusting pricing, conducting auctions, sorting spectrum requests by predicted revenue, etc. In performing the above example actions, real-time trading engine 400' may receive spectrum availability information and requests to reclaim leased spectrum from spectrum owners, as well as spectrum requests and auction bids from spectrum requests. In response, real-trading engine 400' may provide notification of returned spectrum to spectrum owners, as well as initial bids and bid updates for auctions to spectrum requestors that are participating in spectrum auctions.

In at least one example implementation, real-time trading engine 400' may include, for example, core algorithm 900, spectrum request queue 902, auction engine 904 and predicted revenue engine 906. Analytics engine 402' may include, for example, statistical engine 908 and pricing curve setting engine 910. While the above elements making up real-time trading engine 400' and analytics engine 402' have been illustrated individually, it is also possible for some or all of elements 900-906 to be consolidated and/or for elements 908-910 to be consolidated (e.g., depending on the configuration of CSMS 100). In one embodiment, core algorithm 900 may be central engine that orchestrates the process by which available spectrum is allocated to spectrum requestors. In this role, core algorithm 900 may access spectrum request queue 902 to determine the pending spectrum requests. For example, spectrum requests may request a certain amount of spectrum (e.g., S1) for a certain time period (e.g., T1) and may include an amount of money that the spectrum requestor is willing to pay (e.g., bid B1). Core algorithm 900 may then determine, based on the spectrum availability information received from the spectrum owners taken in view of the amount of spectrum being requested, a manner in which to allocate the available spectrum. For example, core algorithm 900 may use auction engine 904 for allocating available spectrum if the amount of available spectrum is less than the amount of spectrum being requested, and on the other hand, may use predicted revenue engine 906 if the amount of available spectrum is greater than the amount of spectrum being requested.

In either instance, core algorithm 900 will need pricing information for determining an initial bid for starting an auction, for determining predicted revenue based on spectrum requests received from spectrum requestors, etc. This information may be obtained from a pricing curve determined by statistical engine 908 and/or pricing curve setting engine 910. Statistical engine 908 may provide a learning mechanism by which spectrum occupancy and utilization statistics for available resources (e.g., available spectrum) may be determined. The utilization statistics may be based on historical usage information (e.g., which may comprise prior "current usage information" stored in persistence module 112 by real-time trading engine 400') and requests pending in spectrum request queue 902. The utilization statistics may be employed by pricing curve setting module to set a pricing curve using operations, for example, as set forth in FIG. 10.

Figure 10:
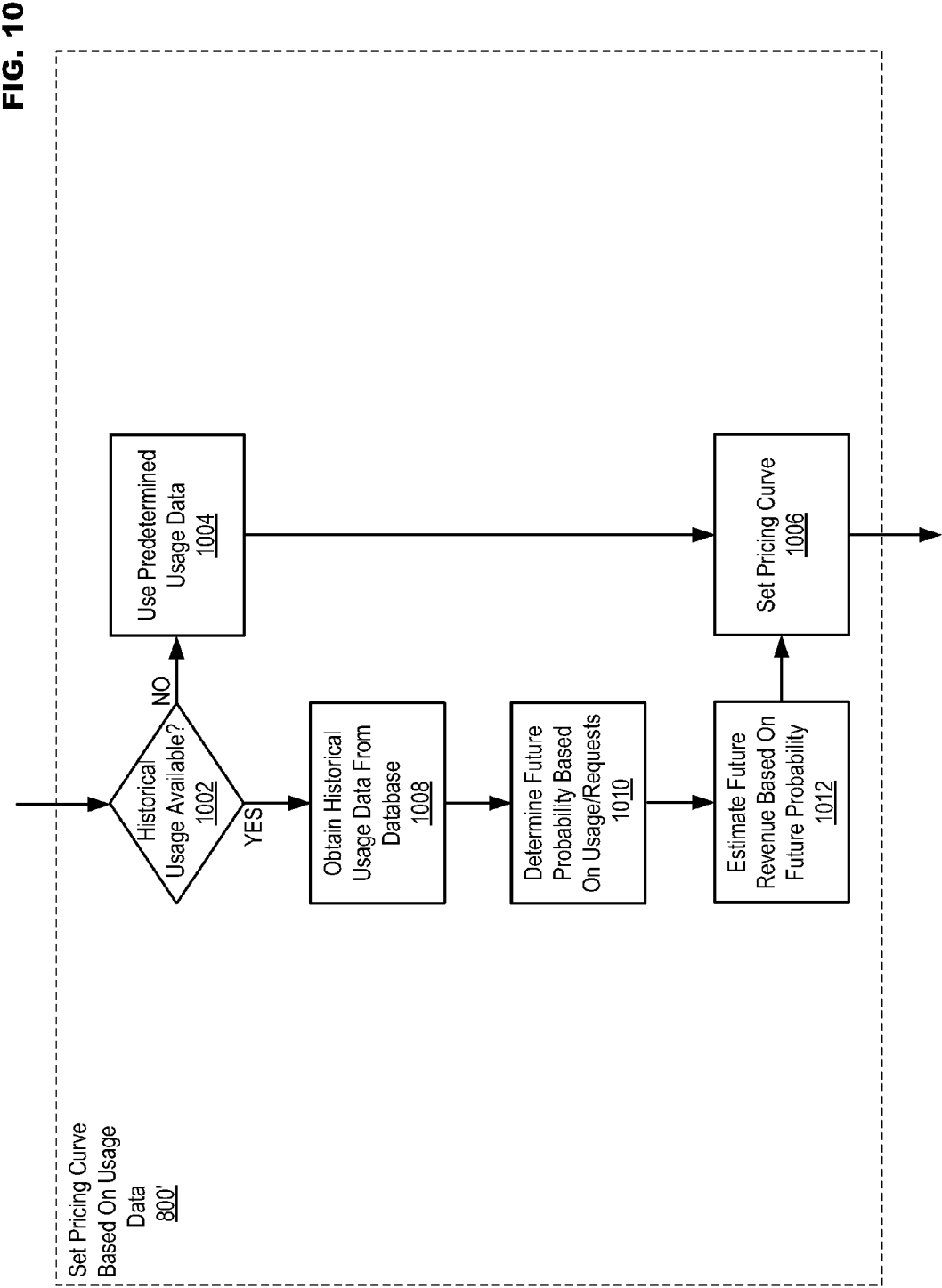
FIG. 10 illustrates example operations related to setting a pricing curve based on usage data in accordance with at least one embodiment of the present disclosure.

FIG. 10 illustrates example operations related to setting a pricing curve based on usage data in accordance with at least one embodiment of the present disclosure. FIG. 10 discloses an example of operations that may be encompassed within setting a pricing curve based on usage data in operation 800'. Initially, a determination may be made in operation 1002 as to whether historical usage information is available. For example, historical usage information may include, but it not limited to previous pricing curves, previously negotiated spectrum leases, previous wireless usage (e.g., by region, by time period, by spectrum owner or spectrum requestor, etc.), geographic maps describing wireless traffic concentrations, etc. If it is determined in operation 1002 that no historical usage information is available, then in operation 1004 predetermined usage data may be used to set the pricing curve in operation 1006. Predetermined usage data may be, for example, data used to initialize a radio spectrum trading system during startup, and may include usage information corresponding to another geographic region similar to the region in which the radio spectrum trading system will be operating, usage information averaged across a number of different regions, best-guess pricing based on the characteristics of the geographic region, etc.

If it is determined in operation 1002 that historical usage information is available, then in operation 1008 historical usage data may be obtained from a database (e.g., in persistence module 112), which may be followed by determining future usage probability based on the historical usage information and/or present requests to lease bandwidth in operation 1010. Future usage probability may pertain to, for example, frequencies of available spectrum, amounts of available spectrum and lease durations that are predicted to be most popular amongst spectrum requestors. Estimating future probability information helps to predict what will likely be the most frequently request received lease request. In operation 1012, predicted future revenue may then be estimated based on the future probability. The predicted future revenue allows the radio spectrum trading system to calibrate the pricing curve in operation 1006. In this manner, revenue generation may be maximized by making sure that the majority of lease requests may be fulfilled by the system.

Figure 11:
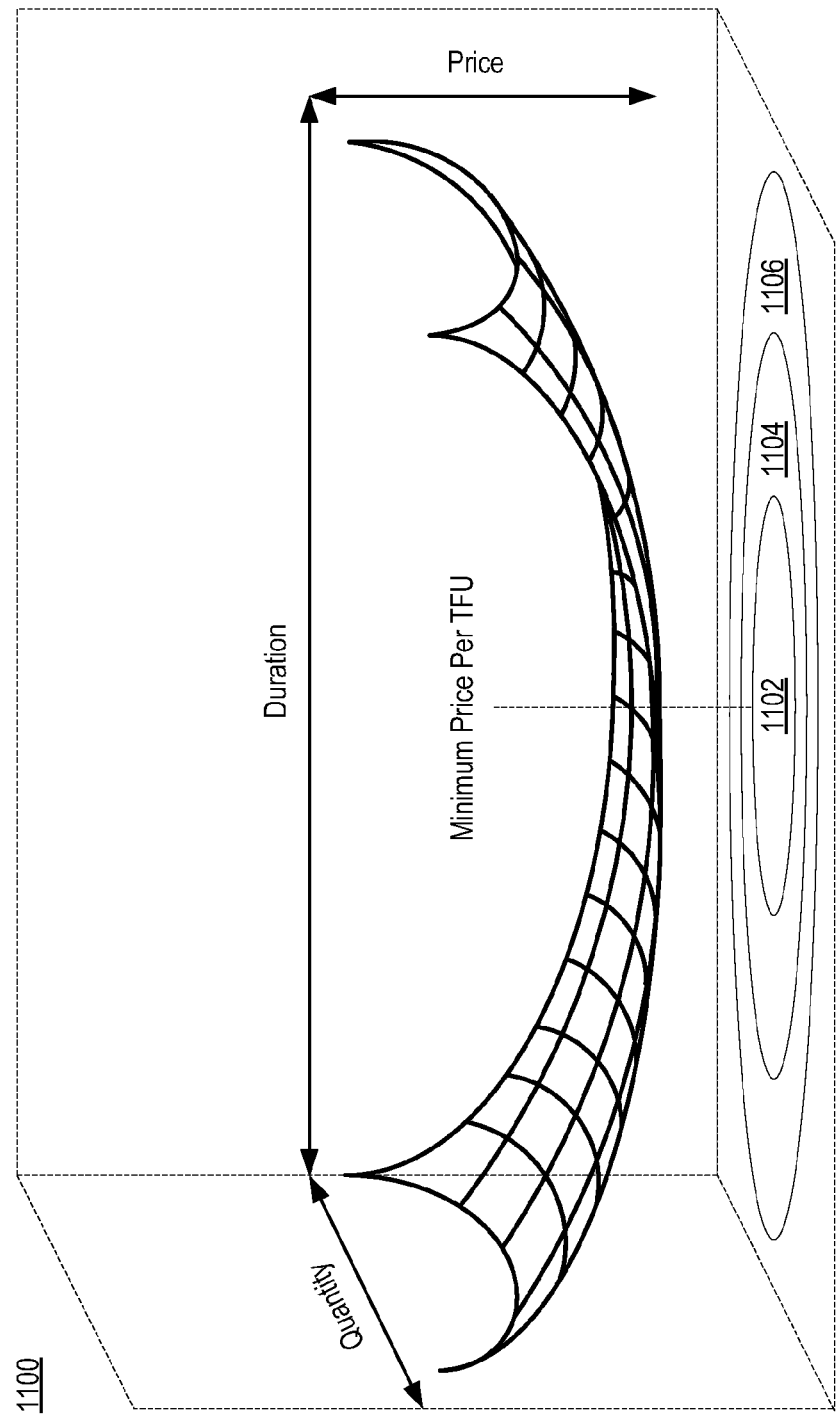
FIG. 11 illustrates an example pricing curve in accordance with at least one embodiment of the present disclosure.

FIG. 11 illustrates an example pricing curve in accordance with at least one embodiment of the present disclosure. While FIG. 11 discloses an example pricing curve 1100, other shapes of pricing curves are also possible depending on the pricing philosophy being employed in the system. Example pricing curve 1100 is displayed on three-dimensional axes that describe the relationship between quantity (of available spectrum requested), duration (of the spectrum lease) and price (for the leased spectrum). A minimum price per time frequency unit (TFU) is shown at the center of region 1102. In the disclosed embodiment, the pricing in curve 1100 moves upward from the minimum at the center of region 1102 if the quantity get higher or lower and also if the duration gets higher and lower. Configuring pricing curve 1100 in this manner allows focus to be placed on maximizing the number of leases that fall with in region 1102 of curve 1100 (e.g., the region where the future probability determined in FIG. 9 predicted that the leases would be concentrated). Outside of region 1102 (e.g., regions 1104 or 1106) the price per TFU rises. In effect, regions 1104 and 1106 may be deemed "penalty" regions in that the price per TFU may rise substantially because the quantity of available spectrum requested and/or lease duration is too small (e.g., it is not economically viable to process the lease transaction) or too much (e.g., greedy in that most requestors will not actually use the spectrum). As a result, requestors (e.g., wireless service providers) that desire the lowest price per TFU will tend to focus on requests falling within region 1102, which will tend to maximize revenue for radio spectrum trading.

Figure 12:
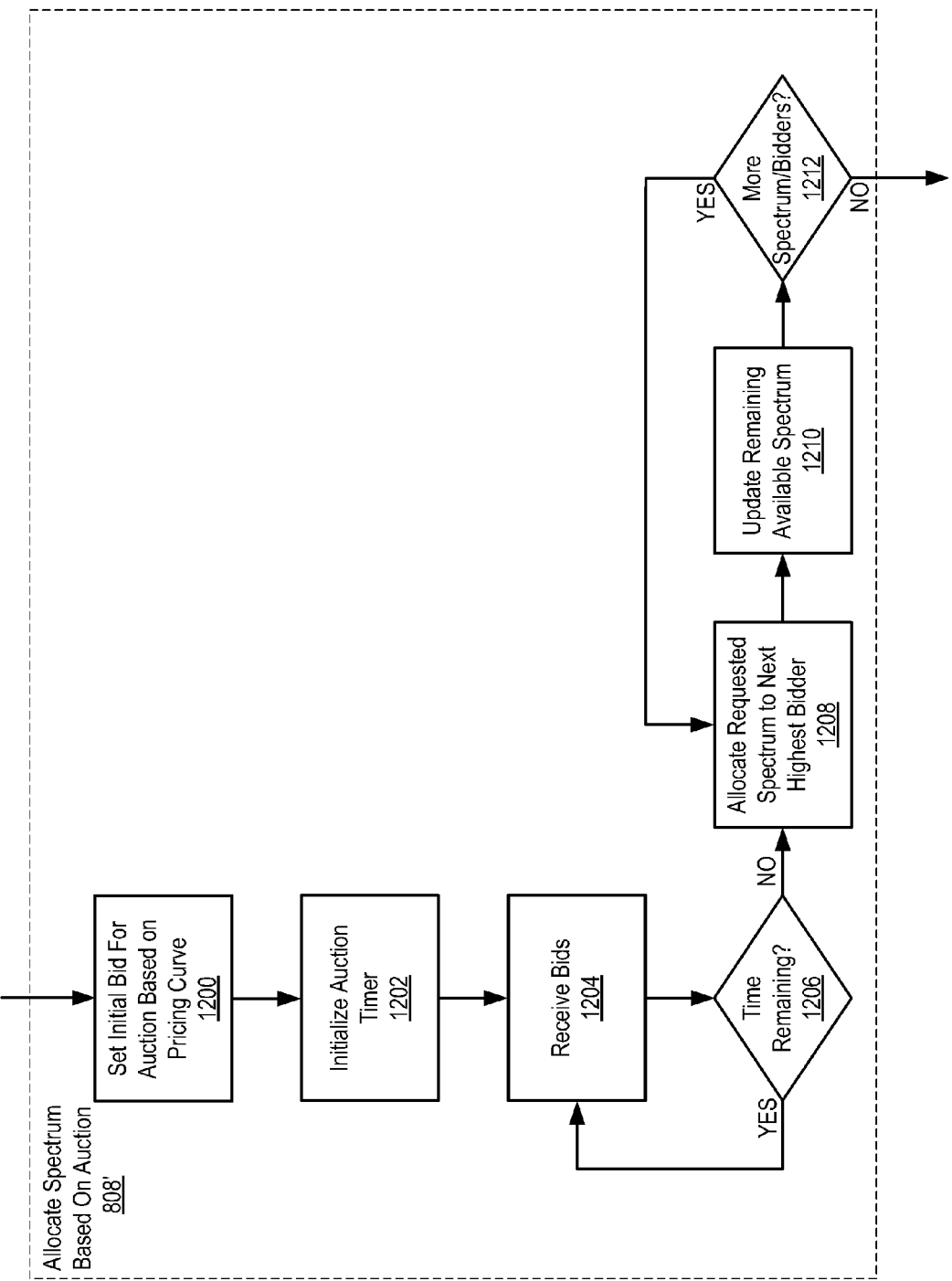
FIG. 12 illustrates example operations related to allocating spectrum based on an auction in accordance with at least one embodiment of the present disclosure.

FIG. 12 illustrates example operations related to allocating spectrum based on an auction in accordance with at least one embodiment of the present disclosure. Following pricing curve 1200 being set and the determination that there is the amount of bandwidth requested is greater than the available bandwidth, then example operations such as illustrated in FIG. 12 may then be employed to allocate spectrum based on an auction as set forth in operation 808'. For example, in operation 1200 an initial bid for the auction may be set based on pricing curve 1000. In one embodiment, the initial bid may be based on the minimum price per TFU plus a positive gap constant. The positive gap constant may be based on, for example, empirical observations of how bidding proceeded in prior auctions. In operation 1202, an auction timer may be reset prior to commencing the auction in operation 1204. In particular, the auction time may be started and bids may then be received in operation 1202 until it is determined in operation 1206 that no time remains based on the expiration of the auction timer.

Expiration of the auction in operation 1206 may be followed by allocating the spectrum requested to the next highest bidder in the auction in operation 1208 (e.g., the highest bidder, the next-highest bidder, etc.). In operation 1210 the amount of available spectrum may be updated prior to moving to the next highest bidder in operation 1212. Allocation of available spectrum may continue in this manner until all of the available spectrum has been allocated to requestors or there are no more requestors remaining to which to allocate the spectrum (e.g., running out of available spectrum being the more probable result as the decision to proceed with operation 806' was predicated on the amount of requested spectrum being more than the available spectrum).

Figure 13:
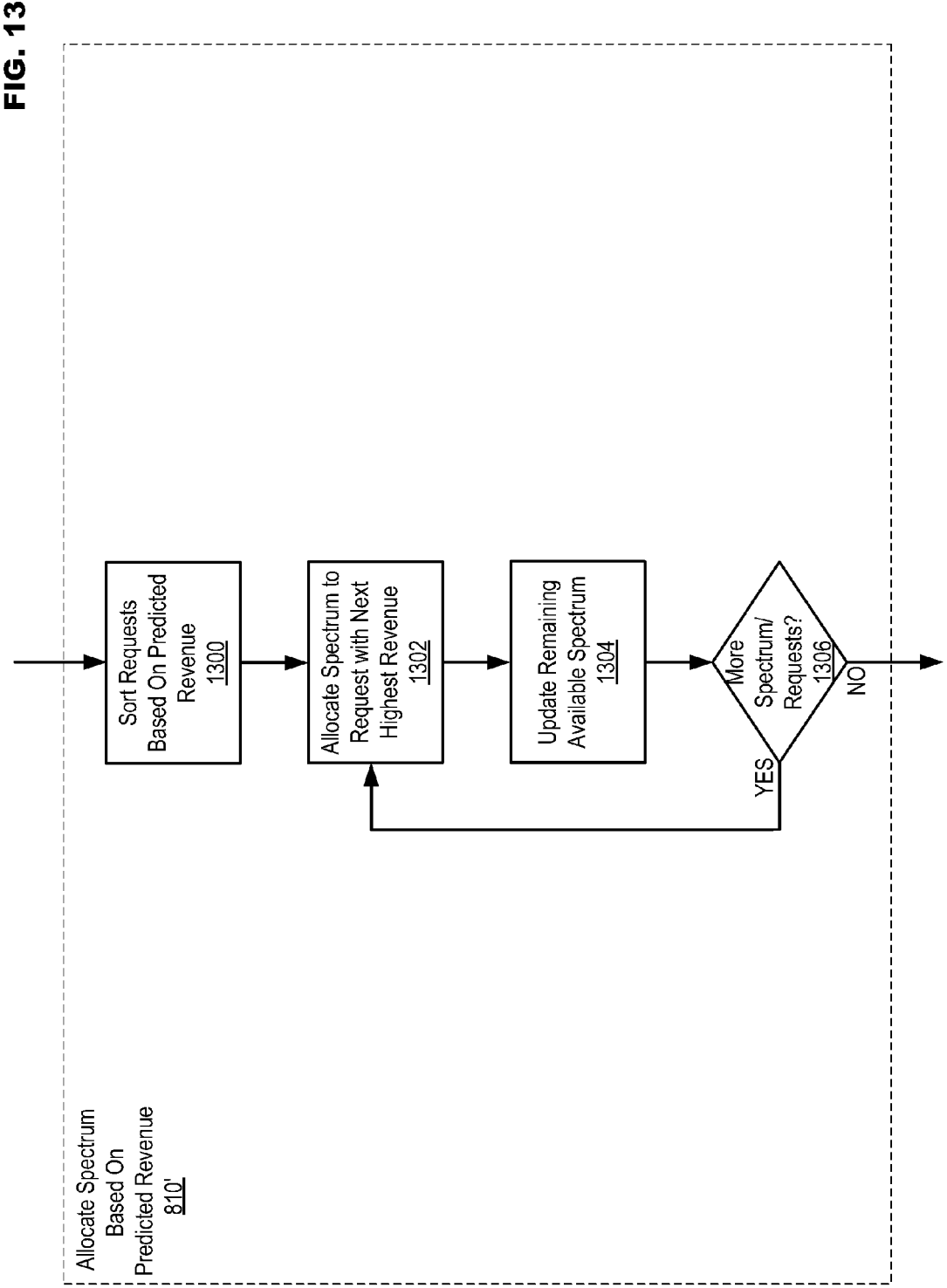
FIG. 13 illustrates example operations related to allocating spectrum based on predicted revenue in accordance with at least one embodiment of the present disclosure.

FIG. 13 illustrates example operations related to allocating spectrum based on predicted revenue in accordance with at least one embodiment of the present disclosure. If it is determined in operation 804 that the amount of available spectrum is greater than the amount of requested spectrum, then in operation 810' the available spectrum may be allocated based on predicted revenue to, for example, maximize revenue for the radio spectrum trading system. In operation 1300 the requests to lease available spectrum may be sorted based on predicted revenue. The amount of revenue predicted to be generated by the request may be based on pricing curve 1000. For example, requests for revenue that fall within region 1002 of pricing curve 1000 generate more revenue because they are maximizing usage of available spectrum where it is predicted to be most profitable. Requests that fall into regions 1004 or 1006 of pricing curve 1000 may be penalized for inefficient use of available spectrum, and thus, may have lower predicted revenue.

In operation 1302, available spectrum may be allocated to fulfill the request for available spectrum having the next highest predicted revenue. For example, the request having the highest predicted revenue may be allocated, followed by the request having the next-highest predicted revenue, etc. The remaining available spectrum may then be updated in operation 1304 prior to allocating spectrum to the request having the next highest predicted revenue. Operations 1302 and 1304 may continue until it is determined in operation 1306 that all available spectrum has been allocated or all the pending requests have been serviced. In this instance the probability is higher that all spectrum requests will be fulfilled before the available spectrum is consumed since in the original determination more available spectrum existed. However, this could change if available spectrum is reclaimed by the spectrum owner, causing a reduction in the amount of available spectrum and possibly an increase in the number of requests due to lease termination.

While FIGS. 7, 10 and 11-12 illustrate operations according to different embodiments, it is to be understood that not all of the operations depicted in FIGS. 7, 10 and 11-12 are necessary for other embodiments. Indeed, it is fully contemplated herein that in other embodiments of the present disclosure, the operations depicted in FIGS. 7, 10 and 11-12, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to radio spectrum trading. Radio spectrum trading involves determining available radio spectrum and requestors desiring to lease portions of the available radio spectrum, and for allocating the available spectrum to the requestors. A pricing curve may be set based on historical information and/or requests to lease spectrum. A determination may then be made as to whether an amount of available spectrum is less than or greater than an amount spectrum being requested. If it is determined that the amount of available spectrum is less than the amount of spectrum being requested, then an auction may be conducted for the available spectrum with the initial bid being set based on the pricing curve. If the amount of available spectrum is greater than the amount of spectrum being requested, then the requests may be sorted based on predicted revenue generation and the available spectrum may be allocated in order from highest to lowest revenue generated.

The following examples pertain to further embodiments. In one example there is provided a system. The system may include a core services module to determine radio spectrum trade transactions for trading a spectrum of radio frequencies for use in wireless communication, the core services module including at least an analytics engine to set a pricing curve based on usage data, and a real-time trading engine to determine spectrum availability in view of spectrum requests received from requestors desiring to lease available spectrum and to allocate available spectrum to fulfill the spectrum requests based on the spectrum availability determination and the pricing curve.

The above example system may be further configured, wherein the analytics engine being to set a pricing curve based on usage data comprises the analytics engine being to determine if historical usage data is available and, if it is determined that the historical usage data is not available, to set the pricing curve based on predetermined usage data. In this configuration the example system may be further configured, wherein, if it is determined that the historical usage data is available, the analytics engine is to determine future probability for receiving spectrum requests requesting at least one of certain spectrum quantity or certain lease duration, the future probability determination being based on at least one of the historical usage data and the spectrum requests, to further determine future revenue estimates based on the future probability, and to set the pricing curve based on the future revenue estimates.

The above example system may be further configured, alone or in combination with the above further configurations, wherein the real-time trading engine being to determine spectrum availability comprises the real-time trading engine being to determine if an amount of available spectrum is greater than an amount of spectrum requested in the spectrum requests. In this configuration the example system may be further configured, wherein, if it is determined that the amount of available spectrum is less than the amount of spectrum requested in the spectrum requests, the real-time trading engine being to allocate available spectrum to fulfill the spectrum requests comprises the real-time trading engine being to auction the available spectrum based on bids submitted by the requestors and to allocate the available spectrum based on a highest bid to a lowest bid received during the auction. In this configuration the example system may be further configured, wherein the real-time trading engine is further to set an initial bid based on a minimum price determined from the pricing curve plus an empirical gap value. In this configuration the example system may be further configured, wherein, if it is determined that the amount of available spectrum is greater than the amount of spectrum requested in the spectrum requests, the real-time trading engine being to allocate available spectrum to fulfill the spectrum requests comprises the real-time trading engine being to sort the spectrum requests by predicted revenue generation and to allocate the available spectrum based on the sorting. In this configuration the example system may be further configured, wherein determining the predicted revenue for each spectrum request is based at least on the pricing curve.

The above example system may be further configured, alone or in combination with the above further configurations, wherein the real-time trading engine comprises at least one of a core algorithm, a spectrum request queue, an auction engine and a predicted revenue engine.

In another example there is provided a method. The method may include setting a pricing curve based on usage data, the pricing curve being usable for trading a spectrum of radio frequencies for use in wireless communication, determining spectrum availability in view of spectrum requests received from requestors desiring to lease available spectrum, and allocating the available spectrum to fulfill the spectrum requests based on the spectrum availability determination and the pricing curve.

The above example method may be further configured, wherein setting the pricing curve based on usage data comprises determining if historical usage data is available, and if it is determined that the historical usage data is not available, setting the pricing curve using predetermined usage data. In this configuration the example method may further comprise, if it is determined that the historical usage data is available, determining future probability for receiving spectrum requests including at least one of certain spectrum quantity or certain lease duration, the future probability being determined based on at least one of the historical usage data and the spectrum requests, determining future revenue estimates based on the future probability, and setting the pricing curve based on the future revenue estimates.

The above example method may be further configured, alone or in combination with the above further configurations, wherein determining spectrum availability comprises determining if an amount of available spectrum is greater than an amount of spectrum requested in the spectrum requests. In this configuration the example method may further comprise, if it is determined that the amount of available spectrum is less than the amount of spectrum requested in the spectrum requests, auctioning the available spectrum based on bids submitted by the requestors, and allocating the available spectrum based on a highest bid to a lowest bid received during the auction. In this configuration the example method may further comprise setting an initial bid based on a minimum price determined from the pricing curve plus an empirical gap value. In this configuration the example method may further comprise, if it is determined that the amount of available spectrum is greater than the amount of spectrum requested in the spectrum requests, sorting the spectrum requests by predicted revenue generation, and allocating the available spectrum based on the sorting. In this configuration the example method may be further configured, wherein determining the predicted revenue for each spectrum request is based at least on the pricing curve.

In another example there is provided a system including at least a core services module arranged to perform any of the above example methods.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a device configured for radio spectrum trading arranged to perform any of the above example methods.

In another example there is provided a system having means to perform any of the above example methods.

In another example there is provided a system. The system may include
a core services module to determine radio spectrum trade transactions for trading a spectrum of radio frequencies for use in wireless communication, the core services module including at least an analytics engine to set a pricing curve based on usage data, and a real-time trading engine to determine spectrum availability in view of spectrum requests received from requestors desiring to lease available spectrum and to allocate available spectrum to fulfill the spectrum requests based on the spectrum availability determination and the pricing curve.

The above example system may be further configured, wherein the analytics engine being to set a pricing curve based on usage data comprises the analytics engine being to determine if historical usage data is available, if it is determined that the historical usage data is not available, set the pricing curve based on predetermined usage data and if it is determined that the historical usage data is available determine future probability for receiving spectrum requests requesting at least one of certain spectrum quantity or certain lease duration, the future probability determination being based on at least one of the historical usage data and the spectrum requests, determine future revenue estimates based on the future probability, and set the pricing curve based on the future revenue estimates.

The above example system may be further configured, alone or in combination with the above further configurations, wherein the real-time trading engine being to determine spectrum availability comprises the real-time trading engine being to determine if an amount of available spectrum is greater than an amount of spectrum requested in the spectrum requests. In this configuration the example system may be further configured, wherein, if it is determined that the amount of available spectrum is less than the amount of spectrum requested in the spectrum requests, the real-time trading engine being to allocate available spectrum to fulfill the spectrum requests comprises the real-time trading engine being to auction the available spectrum based on bids submitted by the requestors, an initial bid for the auction being based on a minimum price determined from the pricing curve plus an empirical gap value, and to allocate the available spectrum based on a highest bid to a lowest bid received during the auction. In this configuration the example system may be further configured, wherein, if it is determined that the amount of available spectrum is greater than the amount of spectrum requested in the spectrum requests, the real-time trading engine being to allocate available spectrum to fulfill the spectrum requests comprises the real-time trading engine being to sort the spectrum requests by predicted revenue generation based at least on the pricing curve and to allocate the available spectrum based on the sorting.

The above example system may be further configured, alone or in combination with the above further configurations, wherein the real-time trading engine comprises at least one of a core algorithm, a spectrum request queue, an auction engine and a predicted revenue engine.

In another example there is provided a method. The method may include setting a pricing curve based on usage data, the pricing curve being usable for trading a spectrum of radio frequencies for use in wireless communication, determining spectrum availability in view of spectrum requests received from requestors desiring to lease available spectrum, and allocating the available spectrum to fulfill the spectrum requests based on the spectrum availability determination and the pricing curve.

The above example method may be further configured, wherein setting the pricing curve based on usage data comprises determining if historical usage data is available, and if it is determined that the historical usage data is not available, setting the pricing curve using predetermined usage data, and if it is determined that the historical usage data is available determining future probability for receiving spectrum requests including at least one of certain spectrum quantity or certain lease duration, the future probability being determined based on at least one of the historical usage data and the spectrum requests, determining future revenue estimates based on the future probability, and setting the pricing curve based on the future revenue estimates.

The above example method may be further configured, alone or in combination with the above further configurations, wherein determining spectrum availability comprises determining if an amount of available spectrum is greater than an amount of spectrum requested in the spectrum requests. In this configuration the example method may further comprise if it is determined that the amount of available spectrum is less than the amount of spectrum requested in the spectrum requests, auctioning the available spectrum based on bids submitted by the requestors, an initial bid being based on a minimum price determined from the pricing curve plus an empirical gap value, and allocating the available spectrum based on a highest bid to a lowest bid received during the auction. In this configuration the example method may further comprise, if it is determined that the amount of available spectrum is greater than the amount of spectrum requested in the spectrum requests, sorting the spectrum requests by predicted revenue generation based at least on the pricing curve, and allocating the available spectrum based on the sorting.

In another example there is provided a chipset arranged to perform any of the above example methods.

In another example there is provided at least one machine readable medium comprising a plurality of instructions that, in response to be being executed on a computing device, cause the computing device to carry out any of the above example methods.

In another example there is provided a system configured for radio spectrum trading arranged to perform any of the above example methods.

In another example there is provided a device having means to perform any of the above example methods.

In another example there is provided a system. The system may include a core services module to determine radio spectrum trade transactions for trading a spectrum of radio frequencies for use in wireless communication, the core services module including at least an analytics engine to set a pricing curve based on usage data, and a real-time trading engine to determine spectrum availability in view of spectrum requests received from requestors desiring to lease available spectrum and to allocate available spectrum to fulfill the spectrum requests based on the spectrum availability determination and the pricing curve.

The above example system may be further configured, wherein the analytics engine being to set a pricing curve based on usage data comprises the analytics engine being to determine if historical usage data is available and, if it is determined that the historical usage data is not available, to set the pricing curve based on predetermined usage data. In this configuration the example system may be further configured, wherein, if it is determined that the historical usage data is available, the analytics engine is to determine future probability for receiving spectrum requests requesting at least one of certain spectrum quantity or certain lease duration, the future probability determination being based on at least one of the historical usage data and the spectrum requests, to further determine future revenue estimates based on the future probability, and to set the pricing curve based on the future revenue estimates.

The above example system may be further configured, alone or in combination with the above further configurations, wherein the real-time trading engine being to determine spectrum availability comprises the real-time trading engine being to determine if an amount of available spectrum is greater than an amount of spectrum requested in the spectrum requests. In this configuration the example system may be further configured, wherein, if it is determined that the amount of available spectrum is less than the amount of spectrum requested in the spectrum requests, the real-time trading engine being to allocate available spectrum to fulfill the spectrum requests comprises the real-time trading engine being to auction the available spectrum based on bids submitted by the requestors and to allocate the available spectrum based on a highest bid to a lowest bid received during the auction. In this configuration the example system may be further configured, wherein the real-time trading engine is further to set an initial bid based on a minimum price determined from the pricing curve plus an empirical gap value. In this configuration the example system may be further configured, wherein, if it is determined that the amount of available spectrum is greater than the amount of spectrum requested in the spectrum requests, the real-time trading engine being to allocate available spectrum to fulfill the spectrum requests comprises the real-time trading engine being to sort the spectrum requests by predicted revenue generation and to allocate the available spectrum based on the sorting. In this configuration the example system may be further configured, wherein determining the predicted revenue for each spectrum request is based at least on the pricing curve.

The above example system may be further configured, alone or in combination with the above further configurations, wherein the real-time trading engine comprises at least one of a core algorithm, a spectrum request queue, an auction engine and a predicted revenue engine.

In another example there is provided a method. The method may include setting a pricing curve based on usage data, the pricing curve being usable for trading a spectrum of radio frequencies for use in wireless communication, determining spectrum availability in view of spectrum requests received from requestors desiring to lease available spectrum, and allocating the available spectrum to fulfill the spectrum requests based on the spectrum availability determination and the pricing curve.

The above example method may be further configured, wherein setting the pricing curve based on usage data comprises determining if historical usage data is available, and if it is determined that the historical usage data is not available, setting the pricing curve using predetermined usage data. In this configuration the example method may further comprise, if it is determined that the historical usage data is available, determining future probability for receiving spectrum requests including at least one of certain spectrum quantity or certain lease duration, the future probability being determined based on at least one of the historical usage data and the spectrum requests, determining future revenue estimates based on the future probability, and setting the pricing curve based on the future revenue estimates.

The above example method may be further configured, alone or in combination with the above further configurations, wherein determining spectrum availability comprises determining if an amount of available spectrum is greater than an amount of spectrum requested in the spectrum requests. In this configuration the example method may further comprise, if it is determined that the amount of available spectrum is less than the amount of spectrum requested in the spectrum requests, auctioning the available spectrum based on bids submitted by the requestors, and allocating the available spectrum based on a highest bid to a lowest bid received during the auction. In this configuration the example method may further comprise setting an initial bid based on a minimum price determined from the pricing curve plus an empirical gap value. In this configuration the example method may further comprise, if it is determined that the amount of available spectrum is greater than the amount of spectrum requested in the spectrum requests, sorting the spectrum requests by predicted revenue generation, and allocating the available spectrum based on the sorting. In this configuration the example method may be further configured, wherein determining the predicted revenue for each spectrum request is based at least on the pricing curve.

In another example there is provided a system. The system may include means for setting a pricing curve based on usage data, the pricing curve being usable for trading a spectrum of radio frequencies for use in wireless communication, means for determining spectrum availability in view of spectrum requests received from requestors desiring to lease available spectrum, and means for allocating the available spectrum to fulfill the spectrum requests based on the spectrum availability determination and the pricing curve.

The above example system may be further configured, wherein setting the pricing curve based on usage data comprises means for determining if historical usage data is available, and means for, if it is determined that the historical usage data is not available, setting the pricing curve using predetermined usage data. In this configuration the example system may further comprise means for, if it is determined that the historical usage data is available, determining future probability for receiving spectrum requests including at least one of certain spectrum quantity or certain lease duration, the future probability being determined based on at least one of the historical usage data and the spectrum requests, means for determining future revenue estimates based on the future probability, and means for setting the pricing curve based on the future revenue estimates.

The above example system may be further configured, alone or in combination with the above further configurations, wherein determining spectrum availability comprises means for determining if an amount of available spectrum is greater than an amount of spectrum requested in the spectrum requests. In this configuration the example system may further comprise means for, if it is determined that the amount of available spectrum is less than the amount of spectrum requested in the spectrum requests, auctioning the available spectrum based on bids submitted by the requestors, and means for allocating the available spectrum based on a highest bid to a lowest bid received during the auction. In this configuration the example system may further comprise means for setting an initial bid based on a minimum price determined from the pricing curve plus an empirical gap value. In this configuration the example system may further comprise means for, if it is determined that the amount of available spectrum is greater than the amount of spectrum requested in the spectrum requests, sorting the spectrum requests by predicted revenue generation, and means for allocating the available spectrum based on the sorting. In this configuration the example system may be further configured, wherein determining the predicted revenue for each spectrum request is based at least on the pricing curve.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed:

1. A system, comprising:
    a core services module to determine radio spectrum trade transactions for trading a spectrum of radio frequencies for use in wireless communication, the core services module including at least:
        an analytics engine to set a pricing curve based on usage data, wherein:
            when historical usage data is available, the analytics engine is to:
                determine future probability for receiving spectrum requests requesting at least one of certain spectrum quantity or certain lease duration, the future probability determination being based on at least one of the historical usage data and the spectrum requests;
                determine future revenue estimates based on the future probability; and
                set the pricing curve based on the future revenue estimates; and
            when it is determined that the historical usage data is not available, the analytics engine is to set the pricing curve based on predetermined usage data; and
        a real-time trading engine to determine spectrum availability in view of spectrum requests received from requestors desiring to lease available spectrum and to allocate available spectrum to fulfill the spectrum requests based on the spectrum availability determination and the pricing curve.

2. The system of claim 1, wherein the real-time trading engine being to determine spectrum availability comprises the real-time trading engine being to determine if an amount of available spectrum is greater than an amount of spectrum requested in the spectrum requests.

3. The system of claim 2, wherein, if it is determined that the amount of available spectrum is less than the amount of spectrum requested in the spectrum requests, the real-time trading engine being to allocate available spectrum to fulfill the spectrum requests comprises the real-time trading engine being to auction the available spectrum based on bids submitted by the requestors and to allocate the available spectrum based on a highest bid to a lowest bid received during the auction.

4. The system of claim 3, wherein the real-time trading engine is further to set an initial bid based on a minimum price determined from the pricing curve plus an empirical gap value.

5. The system of claim 2, wherein, if it is determined that the amount of available spectrum is greater than the amount of spectrum requested in the spectrum requests, the real-time trading engine being to allocate available spectrum to fulfill the spectrum requests comprises the real-time trading engine being to sort the spectrum requests by predicted revenue generation and to allocate the available spectrum based on the sorting.

6. The system of claim 5, wherein determining the predicted revenue for each spectrum request is based at least on the pricing curve.

7. The system of claim 1, wherein the real-time trading engine comprises at least one of a core algorithm, a spectrum request queue, an auction engine and a predicted revenue engine.

8. A method, comprising:
    setting a pricing curve based on usage data, the pricing curve being usable for trading a spectrum of radio frequencies for use in wireless communication, wherein setting the pricing curve based on usage data comprises:
        in response to a determination that historical usage data is available,
            determining future probability for receiving spectrum requests including at least one of certain spectrum quantity or certain lease duration, the future probability being determined based on at least one of the historical usage data and the spectrum requests;
            determining future revenue estimates based on the future probability; and
            setting the pricing curve based on the future revenue estimates;
        in response to a determined that the historical usage data is not available, setting the pricing curve using predetermined usage data;
    determining spectrum availability in view of spectrum requests received from requestors desiring to lease available spectrum; and
    allocating the available spectrum to fulfill the spectrum requests based on the spectrum availability determination and the pricing curve.

9. The method of claim 8, wherein determining spectrum availability comprises:
    determining if an amount of available spectrum is greater than an amount of spectrum requested in the spectrum requests.

10. The method of claim 9, further comprising:
    if it is determined that the amount of available spectrum is less than the amount of spectrum requested in the spectrum requests, auctioning the available spectrum based on bids submitted by the requestors; and
    allocating the available spectrum based on a highest bid to a lowest bid received during the auction.

11. The method of claim 10, further comprising:
    setting an initial bid based on a minimum price determined from the pricing curve plus an empirical gap value.

12. The method of claim 9, further comprising:
    if it is determined that the amount of available spectrum is greater than the amount of spectrum requested in the spectrum requests, sorting the spectrum requests by predicted revenue generation; and
    allocating the available spectrum based on the sorting.

13. The method of claim 12, wherein determining the predicted revenue for each spectrum request is based at least on the pricing curve.

14. One or more non-transitory machine-readable storage mediums having stored thereon, individually or in combination, instructions that when executed by one or more processors result in the following operations comprising:
    setting a pricing curve based on usage data, the pricing curve being usable for trading a spectrum of radio frequencies for use in wireless communication, wherein setting the pricing curve based on usage data comprises:
        in response to a determination that historical usage data is available, determining future probability for receiving spectrum requests including at least one of certain spectrum quantity or certain lease duration, the future probability being determined based on at least one of the historical usage data and the spectrum requests;

determining future revenue estimates based on the future probability; and setting the pricing curve based on the future revenue estimates;

in response to a determined that the historical usage data is not available, setting the pricing curve using predetermined usage data;

determining spectrum availability in view of spectrum requests received from requestors desiring to lease available spectrum; and allocating the available spectrum to fulfill the spectrum requests based on the spectrum availability determination and the pricing curve.

15. The medium of claim 14, wherein determining spectrum availability comprises instructions that when executed by one or more processors result in the following operations comprising:

determining if an amount of available spectrum is greater than an amount of spectrum requested in the spectrum requests.

16. The medium of claim 15, further comprising instructions that when executed by one or more processors result in the following operations comprising:

if it is determined that the amount of available spectrum is less than the amount of spectrum requested in the spectrum requests, auctioning the available spectrum based on bids submitted by the requestors; and allocating the available spectrum based on a highest bid to a lowest bid received during the auction.

17. The medium of claim 16, further comprising instructions that when executed by one or more processors result in the following operations comprising:

setting an initial bid based on a minimum price determined from the pricing curve plus an empirical gap value.

18. The medium of claim 15, further comprising instructions that when executed by one or more processors result in the following operations comprising:

if it is determined that the amount of available spectrum is greater than the amount of spectrum requested in the spectrum requests, sorting the spectrum requests by predicted revenue generation; and allocating the available spectrum based on the sorting.

19. The medium of claim 18, wherein determining the predicted revenue for each spectrum request is based at least on the pricing curve.

* * * * *